US012739884B2

(12) United States Patent
Xin et al.

(10) Patent No.: US 12,739,884 B2
(45) Date of Patent: Sep. 15, 2026

(54) TRANSMIT OPPORTUNITY SHARING IN A RESTRICTED TARGET WAIT TIME

(71) Applicants: SONY GROUP CORPORATION, Tokyo (JP); SONY CORPORATION OF AMERICA, New York, NY (US)

(72) Inventors: Liangxiao Xin, Santa Clara, CA (US); Li-Hsiang Sun, San Jose, CA (US); Mohamed Abouelseoud, Burlingame, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 434 days.

(21) Appl. No.: 18/165,807

(22) Filed: Feb. 7, 2023

(65) Prior Publication Data

US 2023/0262770 A1 Aug. 17, 2023

Related U.S. Application Data

(60) Provisional application No. 63/268,085, filed on Feb. 16, 2022.

(51) Int. Cl.
*H04W 74/0816* (2024.01)
*H04W 72/1268* (2023.01)

(52) U.S. Cl.
CPC ... *H04W 74/0816* (2013.01); *H04W 72/1268* (2013.01)

(58) Field of Classification Search
CPC ......... H04W 74/0816; H04W 72/1268; H04W 74/0833
See application file for complete search history.

(56) References Cited

U.S. PATENT DOCUMENTS

2017/0294992 A1* 10/2017 Chu .................... H04L 27/2602
2021/0084667 A1 3/2021 Bravo
2021/0329500 A1 10/2021 Cariou
2021/0360646 A1 11/2021 Chu
(Continued)

OTHER PUBLICATIONS

Liangxiao Xin (Sony) : "Channel Reservation for Low Latency Traffic", IEEE Draft; 11-21-0894-02-00BE-CHANNEL-RESERVATION-FOR-LOW-LATENCY-TRAFFIC, IEEE-SA Mentor, Piscataway, NJ USA vol. 802.11 EHT; 802.11 be, No. 2, Feb. 4, 2022 (Feb. 4, 2022), pp. 1-11, XP068188840.
(Continued)

*Primary Examiner* — Kevin M Cunningham
(74) *Attorney, Agent, or Firm* — O'BANION & RITCHEY LLP; John P. O'Banion

(57) ABSTRACT

Wireless IEEE 802.11 communication mechanisms are described for a member STA of a R-TWT SP to gain TXOP channel access before the R-TWT SP, which does not need to end before the start time of the R-TWT SP. On trigger based R-TWT SP, the TXOP time is shared to overlap the R-TWT SP; allowing the AP to behave as the TXOP holder for the frame exchange of latency sensitive traffic during the R-TWT SP. Thus, the R-TWT scheduling AP and member STAs of a R-TWT SP can contend for the channel together before the scheduled start time of the R-TWT SP. When one of these STAs gains channel access, it can reserve a TXOP until the scheduled end time of the R-TWT SP, which may extend beyond the normal TXOP limit.

18 Claims, 31 Drawing Sheets

(56) References Cited

U.S. PATENT DOCUMENTS

| | | | | |
|---|---|---|---|---|
| 2023/0026249 | A1* | 1/2023 | Chu | H04W 28/0268 |
| 2023/0199641 | A1* | 6/2023 | Naik | H04W 76/15 370/318 |
| 2024/0365400 | A1* | 10/2024 | Ajami | H04W 74/04 |

OTHER PUBLICATIONS

Patrice Nezou (Canon) : "CC36 CR for rTWT SP Protection", IEEE Draft; 11-21-1718-02-00BE-CC36-CR-FOR-RTWT-SP-PROTECTION, IEEE-SA Mentor, Piscataway, NJ USA vol. 802.11 EHT; 802.11 be, No. 2, Jan. 7, 2022 (Jan. 7, 2022), pp. 1-4, XP068188231.

* cited by examiner

TRANSMIT OPPORTUNITY SHARING IN A RESTRICTED TARGET WAIT TIME

CROSS-REFERENCE TO RELATED APPLICATIONS

This application claims priority to, and the benefit of, U.S. provisional patent application Ser. No. 63/268,085 filed on Feb. 16, 2022, incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

STATEMENT REGARDING FEDERALLY SPONSORED RESEARCH OR DEVELOPMENT

Not Applicable

BACKGROUND

1. Technical Field

The technology of this disclosure pertains generally to wireless network interaction between TXOPs and R-TWT SPs, and more particularly to sharing TXOP time overlapping the R-TWT SP, and allowing an AP to behave as the TXOP holder.

2. Background Discussion

Industry is always seeking to enhance network efficiency and reduce latency for latency sensitive traffic.

In current IEEE 802.11be networking, if a non-Access Point (non-AP) Extra-High Throughput (EHT) station (STA) which is a member STA of an upcoming Restricted-Target Wake Time (R-TWT) Service Period (SP) gains channel access and becomes a Transmit Opportunity (TXOP) holder, it must ensure its TXOP ends before the start time of the R-TWT SP. Then, the R-TWT scheduling AP and/or the member STAs of the R-TWT SP must then contend for the channel at the start time of the R-TWT SP again to exchange latency sensitive traffic during the R-TWT SP.

During trigger based (TB) R-TWT SP, the member STAs of the R-TWT SP are not allowed to contend for the channel, and the scheduling AP is the only STA that is allowed to contend for the channel during the R-TWT SP.

Current Enhanced Distributed Channel Access (EDCA) protocols set a TXOP limit to limit the maximum TXOP duration that a TXOP holder can reserve the channel when it gains access to it.

These mechanisms and their interaction presently limit the efficiency and timeliness of these TXOP and R-TWT SP operations.

Accordingly, a need exists for enhanced mechanisms for handling TXOP and R-TWT SP operations. The present disclosure addresses the existing shortcomings and provides additional benefits.

BRIEF SUMMARY

A wireless protocol for enhanced transmission of frames between the medium access control (MAC) layers of an IEEE 802.11 network as a wireless station (STA) which is either a separate STA or as a STA in a multiple-link device (MLD), and operating as either a regular STA (non-AP) or an Access Point (AP) STA, for wirelessly communicating with other wireless stations (STAs) using a carrier sense multiple access/collision avoidance (CSMA/CA) in which enhanced distributed channel access (EDCA) is utilized for random channel access on all the links.

The enhanced protocol is configured for reserving channel resources for frame exchanges of latency sensitive traffic with member STAs of the restricted-target wake time (R-TWT) service periods (SPs), as described below.

A non-AP STA obtains channel access before the scheduled start time of a R-TWT SP, and reserves a transmit opportunity (TXOP) that overlaps the R-TWT SP, by the non-AP STA. The non-AP STA, as TXOP holder, performs any desired TXOP operations before the scheduled start time of the R-TWT SP. The non-AP STA shares the TXOP with an AP (e.g., scheduling AP), which is allowed to behave as the TXOP holder until the TXOP or the R-TWT SP ends.

These operations, as described below, may be utilized by either the AP or non-AP stations. Gaining channel access before the scheduled start time of a R-TWT SP. Reserving a TXOP until the scheduled end time of R-TWT SP. Transmitting frames of the latency sensitive traffic of the R-TWT from both the primary access category (AC) and non-primary ACs, and servicing them with higher priority than are given to other frames during the R-TWT SP.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

1. Introduction

Figure 1:
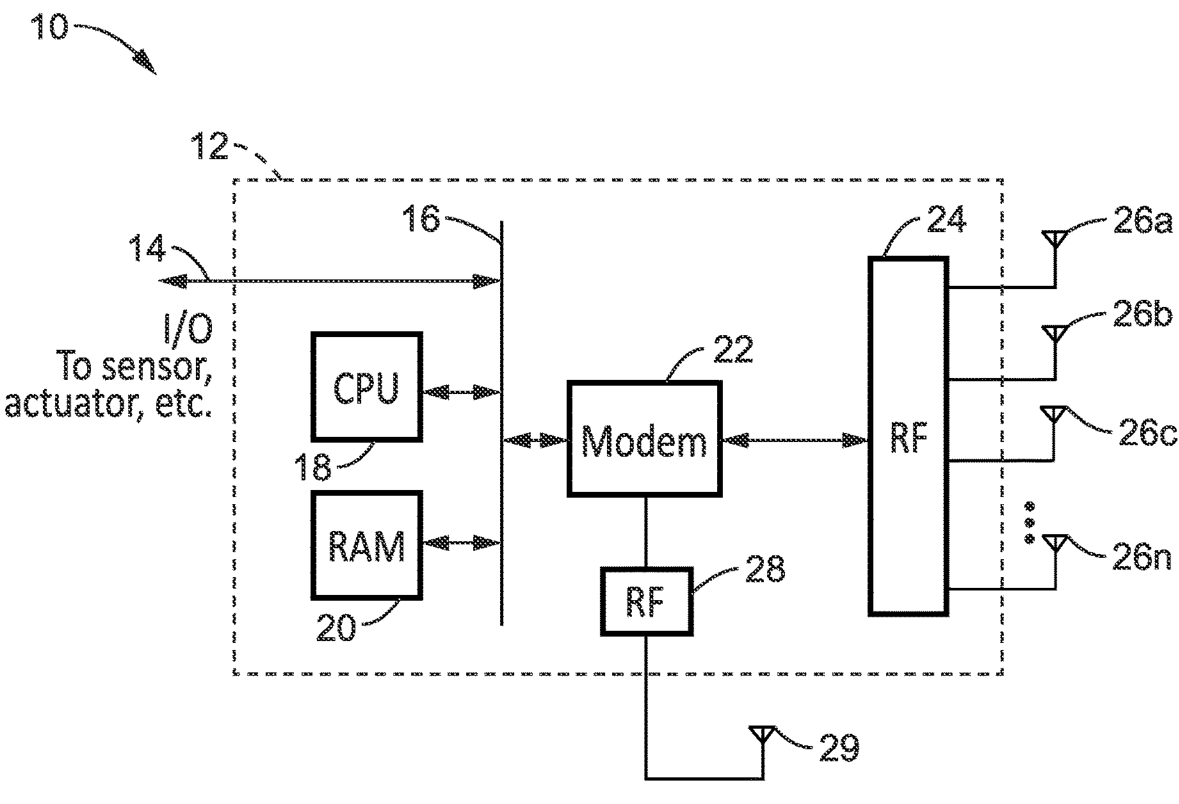
FIG. 1 is a block diagram of communication station hardware, according to at least one embodiment of the present disclosure.

Current wireless technologies using Carrier-Sense Multiple-Access with Collision-Avoidance (CSMA/CA) focus on high network throughput, yet do not provide the support necessary for handling low latency traffic, such as needed by real time applications (RTA); and thus, a technology gap exists.

An RTA requires low latency communication and uses best effort communication. The data generated from the RTA is called latency sensitive traffic; while the data generated from non-time sensitive applications are typically referred to as regular traffic.

The latency sensitive traffic requires low latency due to its high timeliness requirement on delivery. Therefore, the MAC Service Data Unit (MSDU) or Aggregated-MSDU (A-MSDU) of latency sensitive traffic is valid only if it can be delivered within a certain period of time or before its given expiration time.

At the time of this disclosure, the current IEEE 802.11be standard allows use of Restricted TWT (R-TWT) to reserve channel resources for transmission of latency sensitive traffic. A non-Access Point (non-AP) Extra-High Throughput (EHT) STA with the R-TWT option enabled (e.g., “dot11RestrictedTWTOptionImplemented” set to true) as a TXOP holder shall ensure that the TXOP ends before the start time of any R-TWT SPs advertised by the associated AP.

An R-TWT scheduling AP, referred to as an R-TWT scheduling AP, is an EHT AP that supports R-TWT operation and sets the Restricted TWT Support subfield in transmitted EHT Capabilities elements to a first state (e.g., “1”) indicating R-TWT support.

An R-TWT scheduled STA, referred to as an R-TWT scheduled STA, is a non-AP EHT STA that supports R-TWT operation and sets the Restricted TWT Support subfield in transmitted EHT Capabilities elements to a first state (e.g., “1”).

An R-TWT scheduling AP that includes a Restricted TWT Parameter Set field in a broadcast TWT element shall set the Restricted TWT Traffic Info Present subfield of the Restricted TWT Parameter Set field to a second state (e.g., “0”) if the Negotiation Type subfield of the TWT element is equal to a specific value (e.g., “2”).

The R-TWT scheduling AP should indicate in the Restricted TWT Downlink (DL) Traffic Identifier (TID) Bitmap and Restricted TWT Uplink (UL) TID Bitmap subfields for only the TIDs that are mapped to the link on which the R-TWT membership is being set up.

The R-TWT scheduled STA should indicate in the R-TWT DL TID Bitmap and Restricted TWT UL TID Bitmap subfields only the TIDs that are mapped to the link on which the R-TWT membership is being set up.

The TID(s) that are specified in the R-TWT DL TID Bitmap subfield or Restricted TWT UL TID Bitmap subfield with the corresponding DL or UL TID Bitmap Valid subfield set to a first state (e.g., “1”) in a TWT Response frame that indicate to Accept TWT are referred to as R-TWT DL TID(s) or R-TWT UL TID(s), and collectively as R-TWT TID(s), in the following subclauses.

The traffic of the R-TWT TIDs of a R-TWT is regarded as latency sensitive traffic during the SPs of the R-TWT and is prioritized to transmit during the SPs of the R-TWT.

In the present disclosure, the tuple <R-TWTx TIDs, STAy> represents the R-TWT TIDs that are specified during the R-TWTx membership negotiation between the R-TWT scheduling AP and the member STAy. The R-TWT TIDs of R-TWTx (or R-TWTx TIDs) represents the tuples <R-TWTx TIDs, member STA> of all the member STAs of R-TWTx. The R-TWT TIDs may also include the Peer-To-Peer (P2P) traffic that is specified as being latency sensitive traffic.

2. Problem Statement

If a non-AP EHT STA, which is a member STA of an upcoming R-TWT Service Period (SP) gains channel access and becomes a Transmit Opportunity (TXOP) holder, it must ensure its TXOP ends before the start time of the R-TWT SP. Then, the R-TWT scheduling AP and/or the member STAs of the R-TWT SP must again contend for the channel at the start time of the R-TWT SP to exchange the latency sensitive traffic during the R-TWT SP. This process not only reduces transmission efficiency, but also reduces the chances of gaining timely channel access, which may cause significant delay of the transmission during which a real time packet can expire.

An R-TWT SP can be Trigger Based (TB). That is, the member STAs of the R-TWT SP are only allowed to transmit soliciting frames in response to the R-TWT scheduling AP. For example, the member STA can only send a UL data frame in a TB Physical Layer Protocol Data Unit (PPDU) in response to a trigger frame to the R-TWT scheduling AP. The member STA can only transmit a UL or P2P data frame in a Single User (SU) PPDU in response to a Multiple User (MU) Ready-To-Send (RTS) trigger frame transmission. During a trigger based R-TWT SP, the member STAs of the R-TWT SP may not be allowed to contend for the channel. That is, the R-TWT scheduling AP is the only one that is allowed to contend for the channel during the R-TWT SP. This may increase the chance that the R-TWT scheduling AP will gain channel access at a time approaching the start time of the R-TWT SP because there are other STAs which do not support R-TWT which are contending for the channel.

An ideal scenario is that the scheduling AP obtains the TXOP and finishes all frame exchanges of the latency sensitive traffic during that TXOP. However, the current EDCA rule sets a TXOP limit to limit the maximum TXOP duration that a TXOP holder can reserve when it gains channel access; and this limit can be shorter than the R-TWT SP duration. It is inefficient to require the R-TWT scheduling AP or the member STAs of a R-TWT SP to have to recontend for the channel during that R-TWT SP.

3. Contribution of the Present Disclosure

By utilizing the proposed technologies, when a member STA of a R-TWT SP gains channel access before the scheduled start time of the R-TWT SP, it does not need to end its TXOP before the scheduled start time of the R-TWT SP. If the R-TWT SP is trigger based, then it is configured to share its TXOP time which overlaps the R-TWT SP with the R-TWT scheduling AP and thus allows the AP to behave as the TXOP holder for the frame exchange of the latency sensitive traffic during the R-TWT SP.

By utilizing the disclosed technologies, the R-TWT scheduling AP and the member STAs of a R-TWT SP can contend for the channel together before the scheduled start time of the R-TWT SP. When one of these STAs gains channel access, it can reserve a TXOP until the scheduled end time of the R-TWT SP, which may be extend beyond (be longer than) the normal TXOP limit.

4. Embodiments of the Present Disclosure

4.1. Communication Station (STA and MLD) Hardware

FIG. 1 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26*a*, 26*b*, 26*c* through 26*n*. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 2:
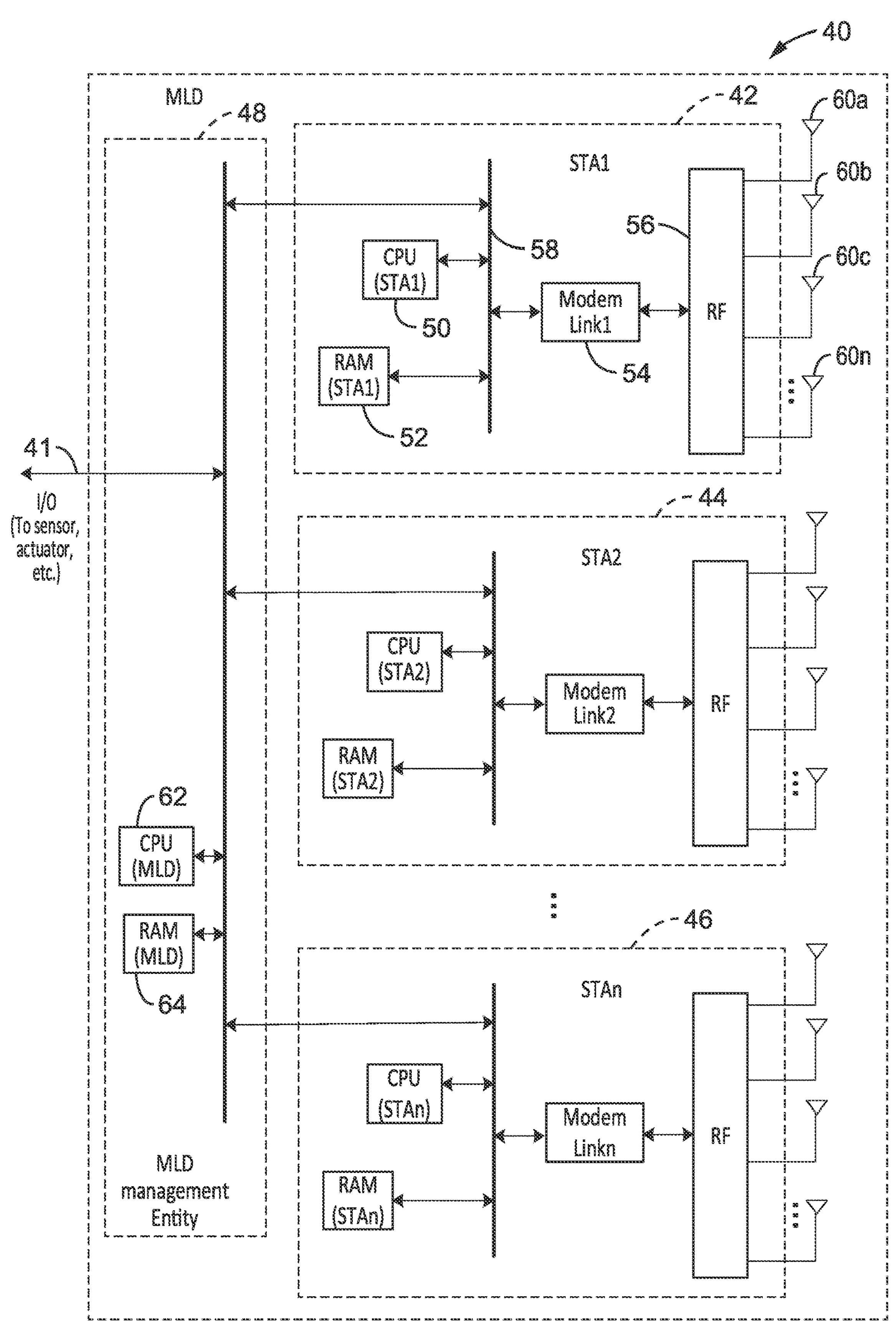
FIG. 2 is a block diagram of Multi-Link Device (MLD) hardware according to at least one embodiment of the present disclosure.

FIG. 2 illustrates an example embodiment 40 of a Multi-Link Device (MLD) hardware configuration. It should be noted that a "Soft AP MLD" is a MLD that consists of one or more affiliated STAs, which are operated as APs. A soft AP MLD should support multiple radio operations, for example on 2.4 GHz, 5 GHz and 6 GHz. Among multiple radios, basic link sets are the link pairs that satisfy simultaneous transmission and reception (STR) mode, e.g., basic link set (2.4 GHz and 5 GHZ), basic link set (2.4 GHz and 6 GHZ).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60*a*, 60*b*, 60*c* through 60*n*, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

Figure 3:
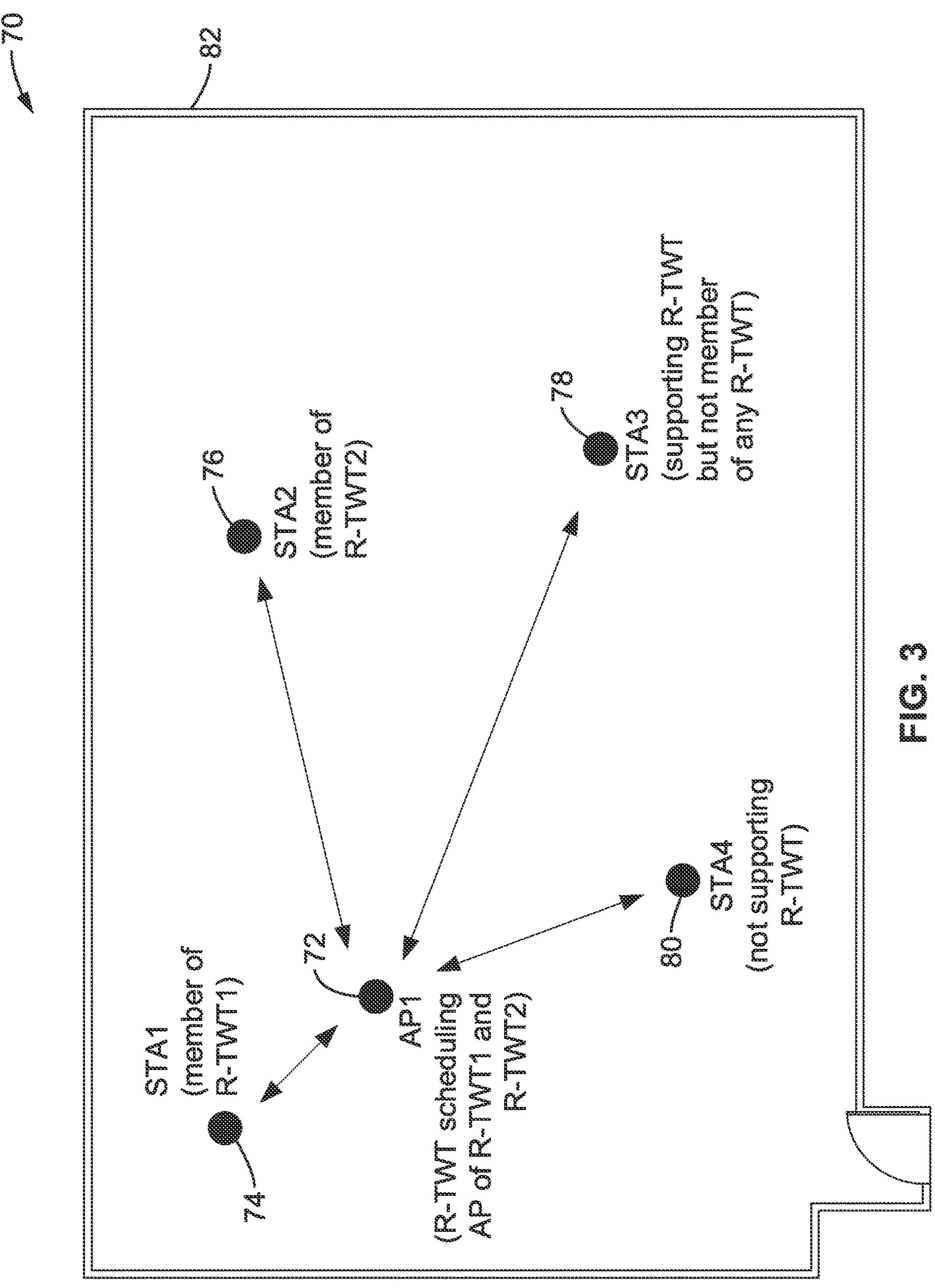
FIG. 3 is a network topology used in examples according to at least one embodiment of the present disclosure.

FIG. 3 illustrates an example embodiment 70 of a network topology utilized as an aid in the following discussions. It should be appreciated that the present disclosure is in no way limited to the topology of this example, as the protocol may be utilized on communications between WLAN STAs and MLDs of any desired topology.

The example assume there is one AP, depicted as AP1 72, and four STAs depicted as STA1 74, STA2 76, STA3 78 and STA4 80, in a given area 82, in this case depicted as a meeting room. All the STAs associate with AP1, and use Carrier-Sense Multiple Access with Collision Avoidance (CSMA/CA) for random channel access. AP1 is the R-TWT scheduling AP and announces R-TWT1 and R-TWT2.

STA1 is a member STA of R-TWT1. STA2 is a member STA of R-TWT2. STA3 is a STA supporting R-TWT but is not a member STA of any R-TWT. STA4 is a STA that does not support R-TWT. It should be appreciated that the AP and any of the STAs may be a STA affiliated with an MLD.

4.2. TXOP Sharing in a R-TWT

According to the current channel access rule for a R-TWT service period (SP), the non-AP STAs that support the R-TWT as a TXOP holder are required to end their TXOP before the scheduled start time of a R-TWT SP. However, if the TXOP holder is a member STA of the R-TWT SP, it should not end its TXOP before the R-TWT SP ends. Otherwise, the member STA and other member STAs, as well as the R-TWT scheduling AP, will need to contend for the channel again for performing the frame exchange on remaining latency sensitive traffic at the scheduled start time of the R-TWT SP. In addition, another round of channel contention cannot guarantee obtaining the TXOP at a time which is close (near) to the scheduled start time of the R-TWT SP, which may significantly delay frame exchange.

The technology of the present disclosure allows a member STA of a R-TWT SP, serving as a TXOP holder, to reserve the TXOP before the scheduled start time of the R-TWT SP which overlaps the R-TWT SP. Stated another way, the member STA of a R-TWT SP does not need to end its TXOP at the scheduled start time of the R-TWT SP.

The present disclosure also describes operations of the wireless communications protocol in which a member STA of a R-TWT SP obtains a TXOP before the scheduled start time of the R-TWT SP and reserves the TXOP that overlaps the R-TWT SP, and it can share its TXOP with the R-TWT scheduling AP and allow the R-TWT scheduling AP to behave (operate) as the TXOP holder during the R-TWT SP.

The present disclosure is configured to allow the R-TWT scheduling AP and the member STAs of a R-TWT SP to contend for the channel together both before and during the R-TWT SP. If one of them obtains the TXOP before the scheduled start time of the R-TWT SP, it can transmit frames following the current EDCA rule of sharing an EDCA TXOP. Following are some examples.

(a) When the R-TWT SP starts, if the R-TWT scheduling AP is the TXOP holder, it can transmit or trigger the frames of the R-TWT TIDs of the R-TWT SP (and the frames of the P2P traffic as latency sensitive traffic that is scheduled to be transmitted during the R-TWT SP) earlier than the frame from the primary AC. Therefore, the frames of the R-TWT Traffic Identifiers (TIDs) of the R-TWT SP, as well as the frames of the P2P traffic as latency sensitive traffic that is scheduled to be transmitted during the R-TWT SP, are regarded as the frames from the primary AC during the R-TWT SP.

(b) When the R-TWT SP starts, if the member STA is the TXOP holder, it can share its TXOP with the AP and allow the AP to behave (operate) as the TXOP holder. The member STA may send an unsolicited Clear-To-Send (CTS) frame to the R-TWT scheduling AP to indicate TXOP sharing. When the CTS frame is transmitted by the member STA to share the TXOP with the AP, the RA field of the CTS frame can be set to the AP Medium Access Control (MAC) address or a special MAC address that is assigned by the AP to all the member STAs of the R-TWT SP. Any member STA of the same R-TWT SP sets the Receiver Address (RA) field to the same special MAC address in the CTS frame to share the TXOP with the AP. In at least one embodiment/mode/option any member STA of the same R-TWT SP uses the same scramble number for the CTS frame to share the TXOP with the AP during the R-TWT SP. In at least one embodiment/mode/option only the member STAs of the R-TWT SP that have R-TWT UL TIDs of the R-TWT SP and/or that have Peer-to-Peer (P2P) traffic that is scheduled during the R-TWT SP can contend for the channel during the R-TWT SP and share the TXOP with the AP.

(c) If the R-TWT SP is trigger based, then the member STAs of the R-TWT SP are not allowed to contend for the channel until the R-TWT SP ends after the AP obtains the TXOP (including the TXOP shared by the non-AP STAs) during the R-TWT SP.

The present disclosure describes a protocol in which when a member STA of a R-TWT SP or the R-TWT scheduling AP obtains a TXOP before the scheduled start time of the R-TWT SP, it can reserve the TXOP until the scheduled end time of the R-TWT SP, which may or may not be limited by the TXOP limit of the primary Access Category (AC). It should be noted that the primary AC represents the AC of which the Enhanced Distributed Channel Access Function (EDCAF) obtains the TXOP.

4.3. Non-AP STA Reserving TXOP Overlapping R-TWT SP

Figure 4:
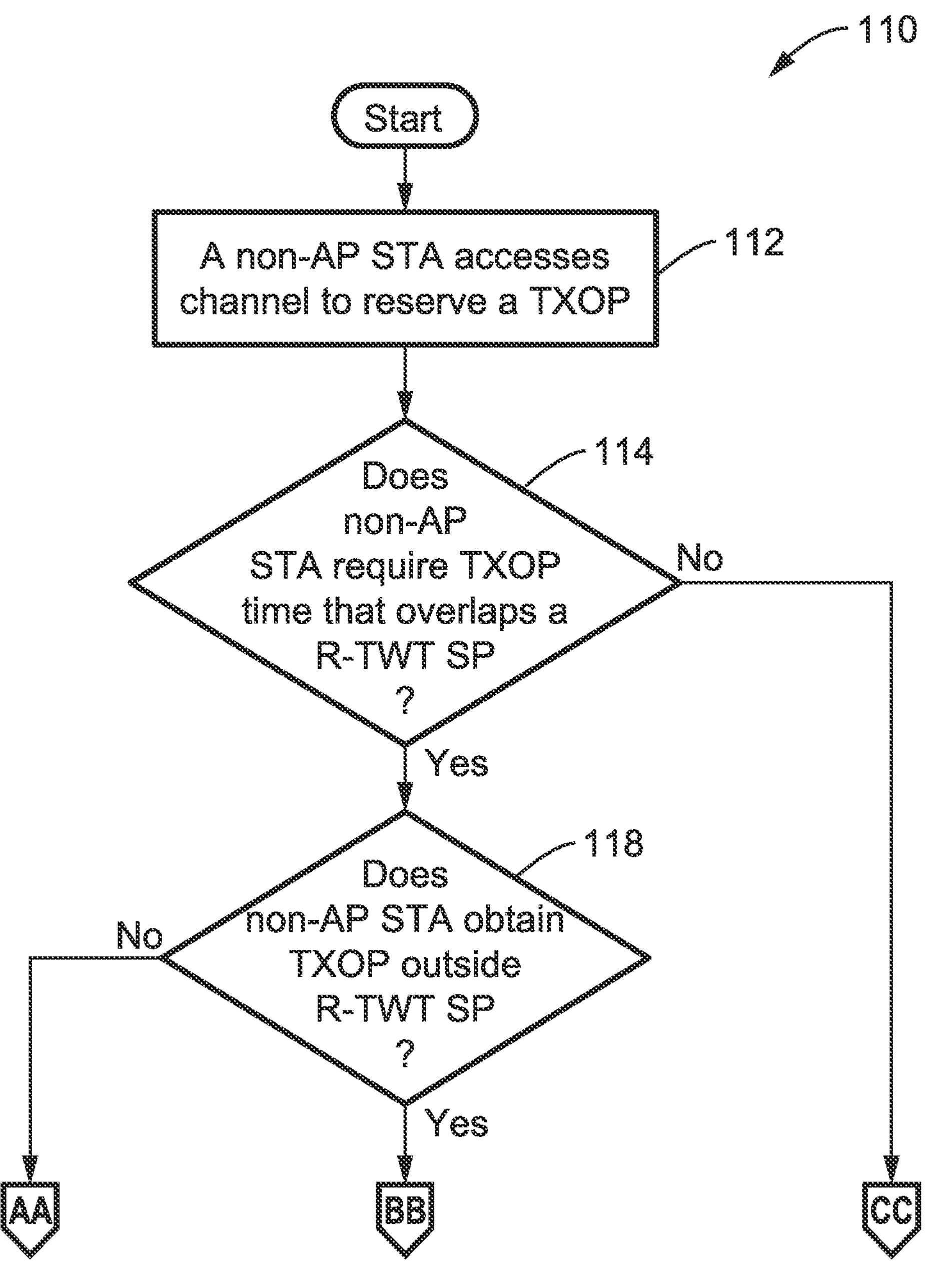
FIG. 4 and FIG. 5 is a flow diagram of non-AP STA reserving a TXOP that overlaps a R-TWT SP according to at least one embodiment of the present disclosure.
Figure 5:
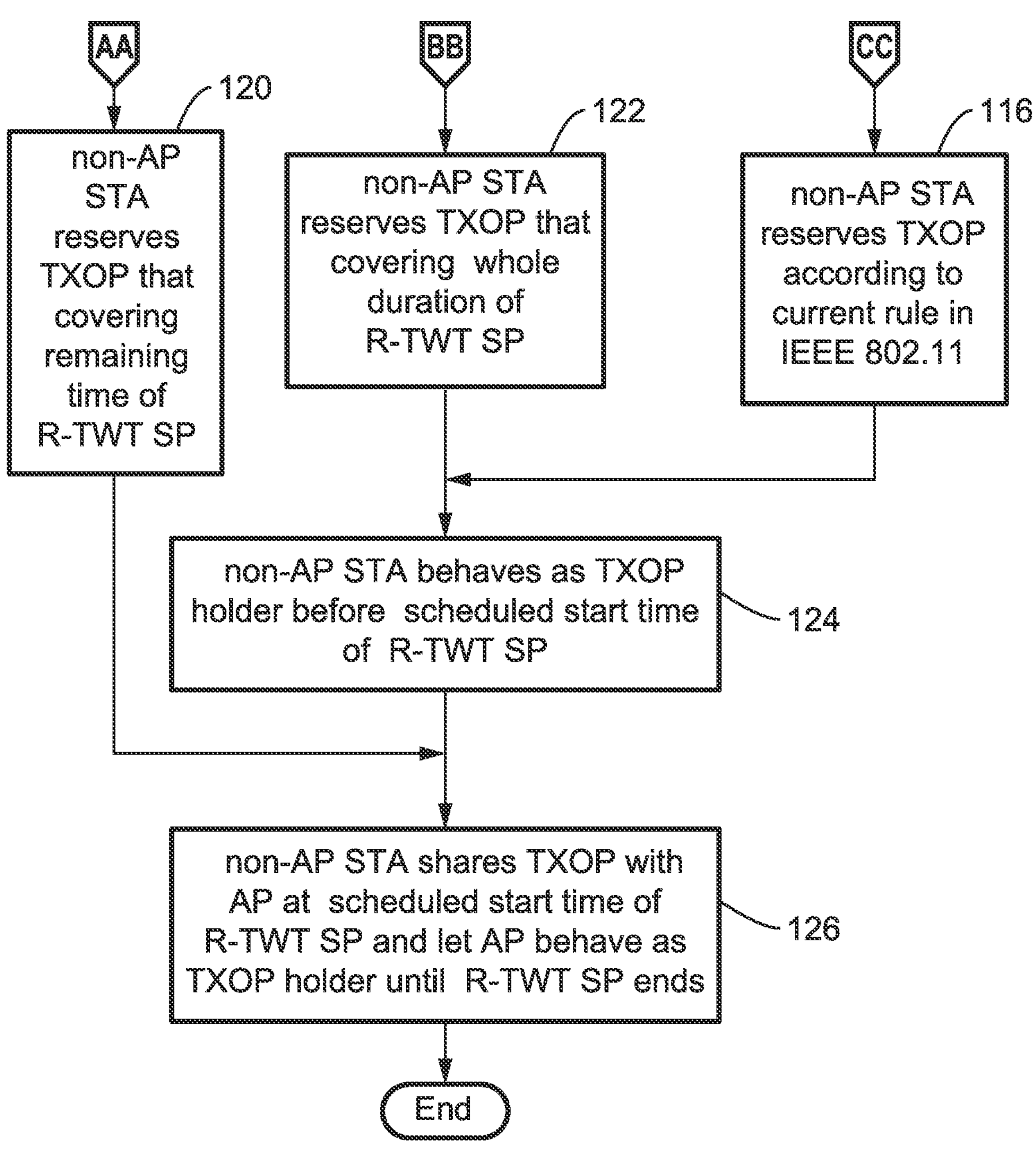

FIG. 4 and FIG. 5 illustrate an example embodiment 110 of a non-AP STA reserving a TXOP that overlaps a R-TWT SP.

A non-AP STA accesses 112 the channel to reserve a TXOP. Check 114 determines if the non-AP STA has obtained the TXOP outside a R-TWT SP (before the R-TWT SP starts) and requires the TXOP time to overlap the R-TWT SP. If the condition is not met, then execution moves to block 116 of FIG. 5, as discussed below. If the condition is met, then at check 118 it is determined if the non-AP STA is to obtain the TXOP outside of the R-TWT SP. If this condition is not met, then execution moves to block 120 of FIG. 5.

If the condition of check 118 is met, then at block 122 the non-AP STA reserves the TXOP which covers the entire duration of the R-TWT SP. During the TXOP time before the scheduled start time of the R-TWT SP, the non-AP STA behaves 124 as the TXOP holder according to current EDCA rule. From at least the scheduled start time of the R-TWT SP, the non-AP STA shares 126 the TXOP with the AP and allows the AP to behave (perform) as the TXOP holder until the R-TWT SP ends.

In at least one embodiment/mode/option, when the AP behaves as the TXOP holder, it can transmit the traffic from the R-TWT Downlink (DL) TIDs of the R-TWT SP or trigger the traffic from the R-TWT (Uplink) UL TIDs of the R-TWT SP and the P2P traffic (or P2P traffic that is regarded as latency sensitive traffic, and that is scheduled with higher priority to transmit during the R-TWT SP) as those traffic are from the primary AC during the shared TXOP.

In at least one embodiment/mode/option the non-AP STA, as described above, represents the member STA of the R-TWT SP (and/or the STAs supporting the R-TWT SP). In at least one embodiment/mode/option the TXOP above represents the TXOP obtained by the EDCAF of the AC of the R-TWT TIDs, or P2P traffic that is regarded as latency sensitive traffic and that is scheduled with higher priority to transmit during the R-TWT SP, of the R-TWT SP.

Considering the case of the conditions of check 118 not being met, then at block 120 of FIG. 5, the non-AP STA obtains the TXOP during a R-TWT SP, then the non-AP STA reserves the TXOP that covers the remaining time of the R-TWT SP and shares the TXOP with the AP, and as shown in block 126 allows the AP to behave (perform) as the TXOP holder until the R-TWT SP ends.

It is possible that when a non-AP STA obtains the channel during the R-TWT SP, it finishes the transmission of the frames of R-TWT UL TIDs of the R-TWT SP or the frames the P2P traffic that is scheduled to be transmitted during the R-TWT SP in the buffer first, then shares the TXOP with AP.

In at least one embodiment/mode/option the non-AP STA above represents the member STA of the R-TWT SP (and/or the STAs supporting the R-TWT SP). It at least one such embodiment it is possible that a member STA of the R-TWT SP can be allowed to contend for the channel during the R-TWT SP only if it has the frames of R-TWT UL TIDs of the R-TWT SP or the frames the P2P traffic that is scheduled to be transmitted during the R-TWT SP in the buffer.

Considering the case of the condition of check 114 not being met, and thus the non-AP STA does not require the TXOP time that overlaps a R-TWT SP, then execution moves to block 116 in FIG. 5, where the non-AP STA reserves the TXOP according to the current rule in IEEE 802.11 (e.g., IEEE 802.11ax), and then performs block 124 and 126 as already described above.

In at least one embodiment/mode/option the TXOP overlapping a R-TWT SP cannot be reserved beyond the scheduled end of the R-TWT SP.

In at least one embodiment/mode/option the TXOP overlapping a R-TWT SP is not limited by the TXOP limit of the primary AC. The TXOP time extending outside the R-TWT SP cannot exceed the TXOP limit of the primary AC.

In at least one embodiment/mode/option if the TXOP ends by the scheduled end time of the R-TWT SP, then the TXOP time is not limited by the TXOP limit of the primary AC.

In at least one embodiment/mode/option the non-AP reserves the TXOP beyond the R-TWT SP (i.e., the non-AP reserves the TXOP after the scheduled end time of the R-TWT SP). Then, the TXOP cannot exceed the TXOP limit of the primary AC.

4.4. AP Obtaining Shared TXOP from the Non-AP STA

Figure 6:
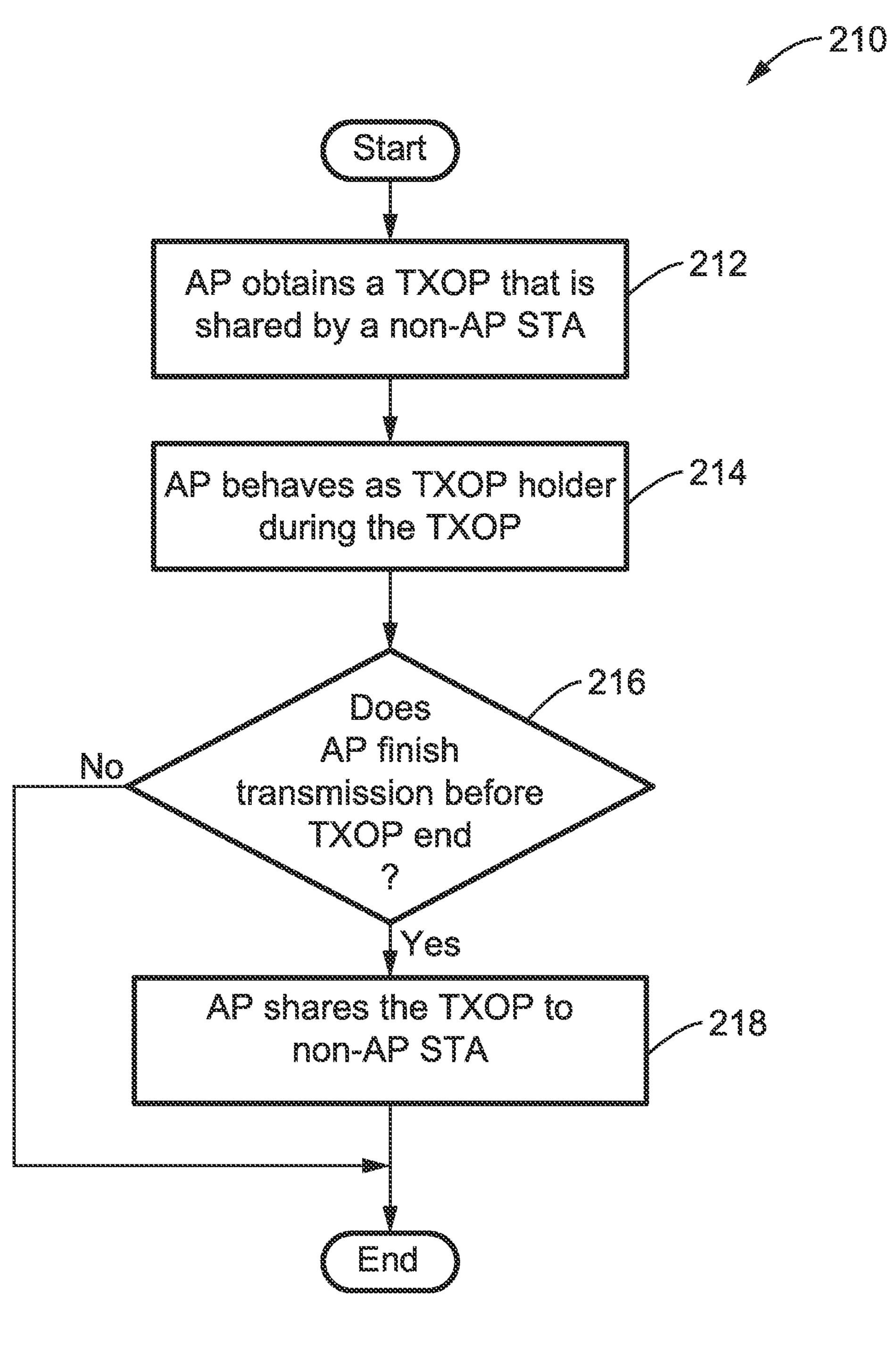
FIG. 6 is a flow diagram of an AP obtaining a shared TXOP from the non-AP STA according to at least one embodiment of the present disclosure.

FIG. 6 illustrates an example embodiment 210 of an AP obtaining a shared TXOP from the non-AP STA. The AP obtains 212 a TXOP that is shared by a non-AP STA that is associated with the AP. Then the AP behaves (performs) 214 as the TXOP holder during the shared TXOP; one example of which is given in FIG. 7.

At check 216 of FIG. 6, it is determined if the AP has finished the transmission before the shared TXOP ends. If the condition is not met, then processing ends. Otherwise, with the condition met, it shares 218 the TXOP with, or returns the TXOP back to, the non-AP STA, before processing ends.

Figure 7:
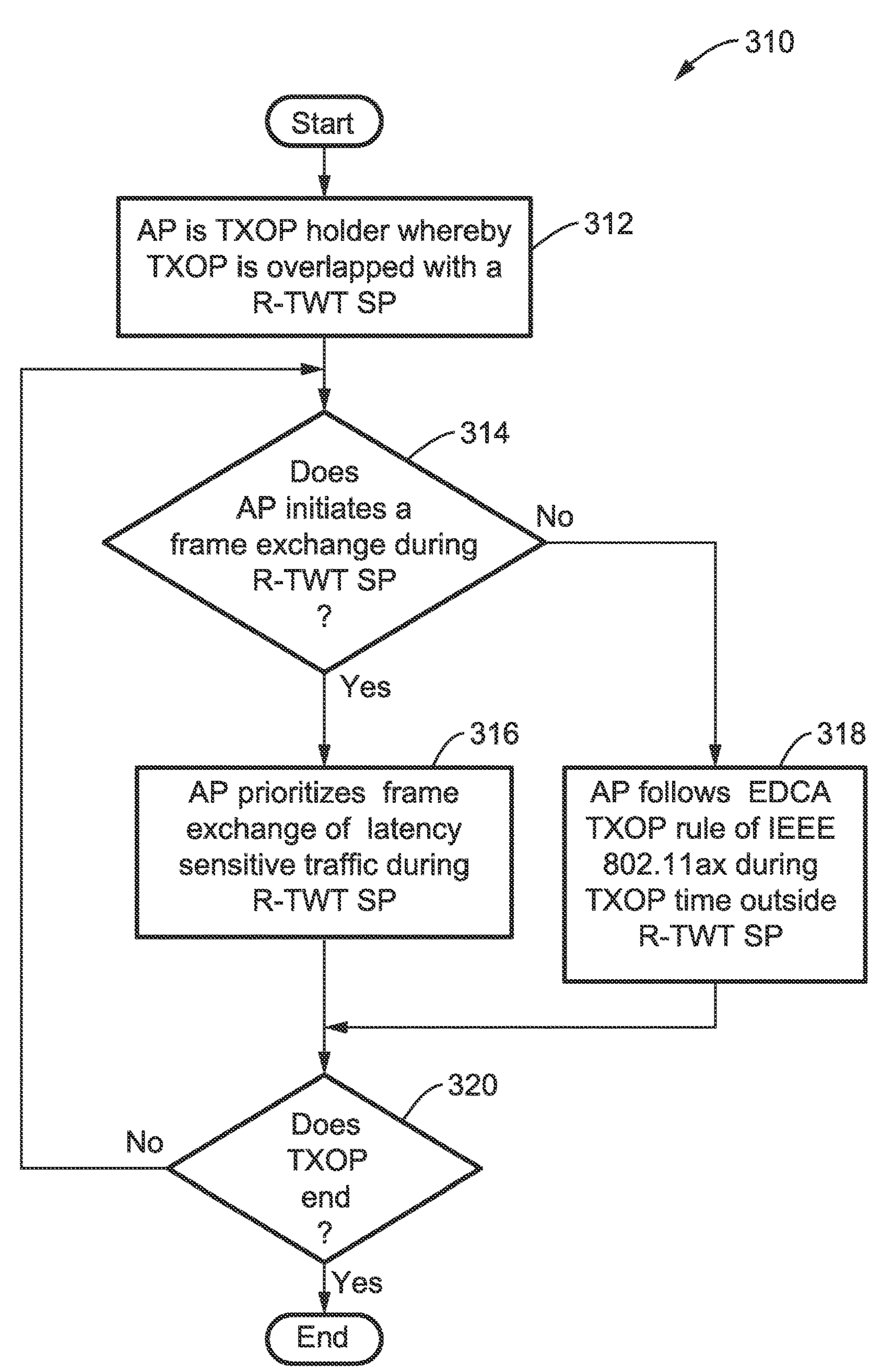
FIG. 7 is a flow diagram of an AP behaving as TXOP holder inside and outside the R-TWT SP according to at least one embodiment of the present disclosure.

FIG. 7 illustrates an example embodiment 310 of an AP behaving as TXOP holder inside and outside the R-TWT SP. It should be noted that the TXOP can be obtained by the AP contending for the channel or the TXOP being shared by another STA.

In this case the AP is the TXOP holder 312 whereby the TXOP is overlapped with a R-TWT SP. Check 314 determines if the AP initiates a frame exchange (e.g., send a DL PPDU requiring BA/ACK, send a trigger frame for UL TB PPDU, or transmits a MU RTS frame for TXOP sharing) during the R-TWT SP. If the condition is met, then the AP prioritizes 316 the frame exchange of the latency sensitive traffic (e.g., R-TWT DL/UL TIDs and P2P traffic of all the member STAs of the R-TWT SP).

Otherwise, if the condition is not met and the AP is initiating a frame exchange outside the R-TWT SP, then the AP follows 318 the EDCA TXOP of IEEE 802.11ax during the TXOP time outside the R-TWT SP.

In either case, check 320 then determines if the TXOP has ended. If it has not ended, then execution returns to check 314, otherwise processing ends. Thus, if the TXOP is obtained by channel contention of the AP, it is possible that the TXOP is not limited by the TXOP limit of the primary AC.

In at least one embodiment/mode/option the AP may be allowed to reserve the TXOP until the end of the R-TWT SP. In at least one embodiment/mode/option the AP may have to end its TXOP by the end of the R-TWT SP. In at least one embodiment/mode/option the AP may have to end its TXOP when the R-TWT SP ends.

When a TXOP is overlapped with a R-TWT SP (or more), the TXOP time outside the R-TWT SP cannot exceed the TXOP limit of the primary AC. If the TXOP limit of the primary AC is 0, then the TXOP time outside the R-TWT SP should be equal to the time of one frame exchange of the primary AC.

In at least one embodiment/mode/option the TXOP as obtained by channel contention of the AP ends by the scheduled end time of the R-TWT SP, and thus the TXOP time is not limited by the TXOP limit of the primary AC.

In at least one embodiment/mode/option the AP reserves the TXOP beyond the R-TWT SP (i.e., the non-AP reserves the TXOP after the scheduled end time of the R-TWT SP). Then, the TXOP cannot exceed the TXOP limit of the primary AC.

5. Example Communication Diagrams 5.1. Example 1

Figure 8:
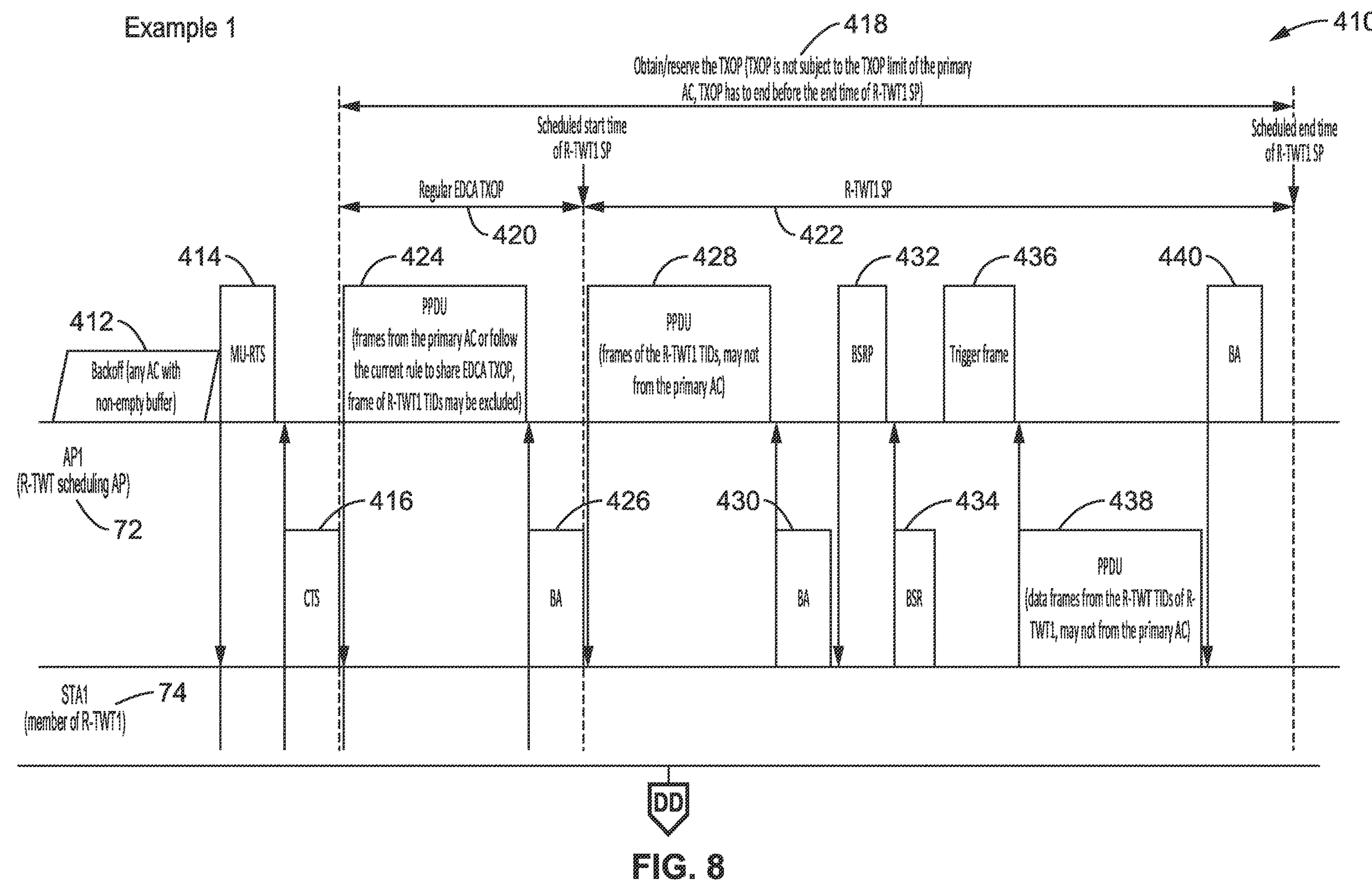
FIG. 8 and FIG. 9 is a communications diagram of Example 1 for R-TWT scheduling according to at least one embodiment of the present disclosure.
Figure 9:
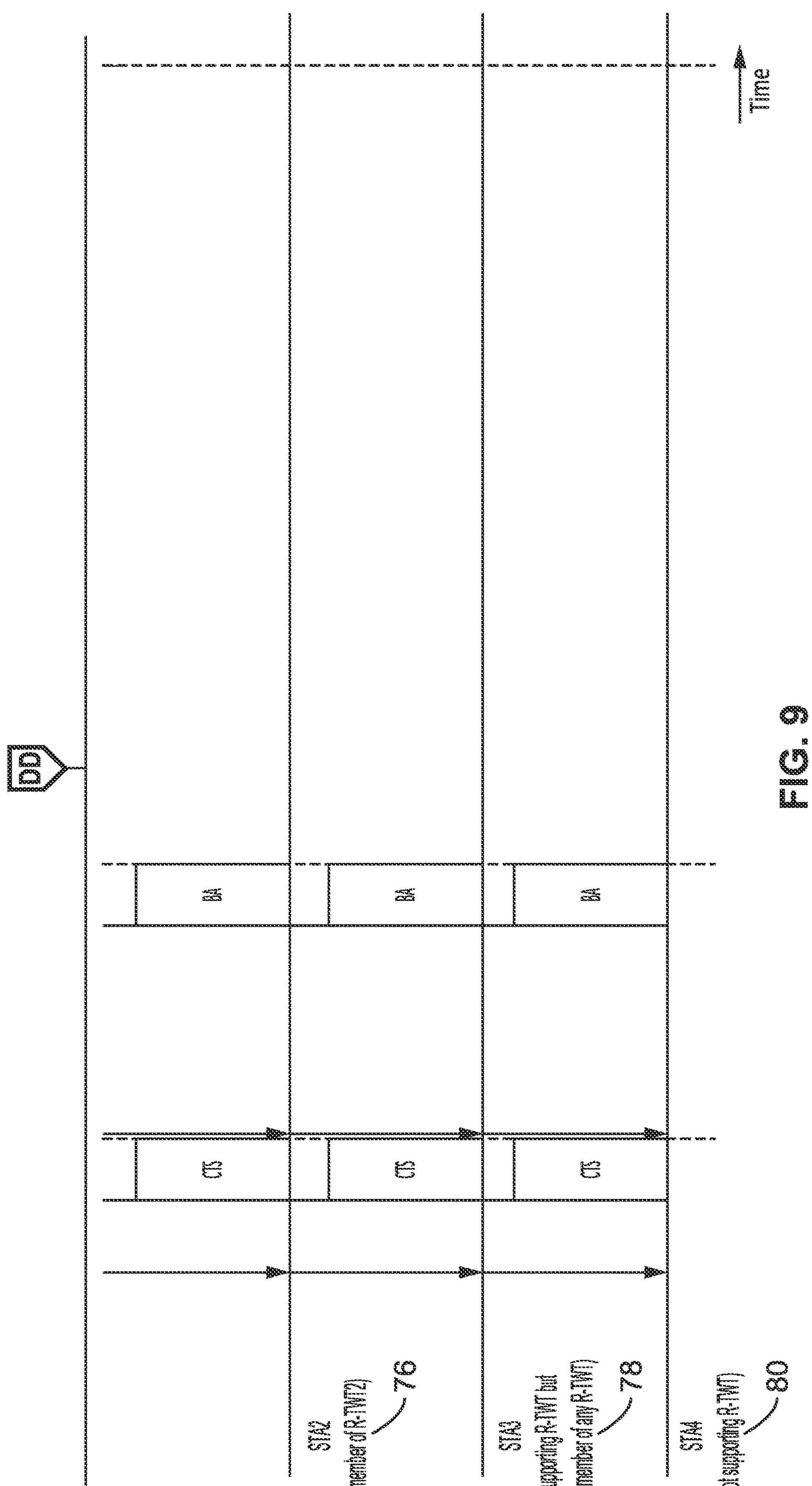

FIG. 8 and FIG. 9 illustrate an example embodiment 410 of R-TWT scheduling with the AP obtaining the TXOP before the scheduled start time of a R-TWT SP. The network topology is shown in FIG. 3.

AP1 72 is the R-TWT scheduling AP and announces two R-TWTs, R-TWT1 and R-TWT2. STA1 74 is a member STA of R-TWT1 and STA2 76 is a member of R-TWT2.

STA3 78 supports R-TWT but is not a member of any R-TWT. STA4 80 does not support R-TWT.

AP1 performs a backoff 412 to contend for channel access using EDCAF(s) corresponding to any AC(s) with non-empty buffer. When AP1 gains channel access, it initiates a MU-RTS/CTS exchange, by sending MU-RTS 414 and receiving CTS 416, to reserve a TXOP 418.

As shown in the example, the AP reserves a portion 420 the TXOP which extends until the end of the scheduled end time of the R-TWT1 SP portion 422. The TXOP duration may exceed the TXOP limit of the primary AC of the TXOP. In at least one embodiment/mode/option the TXOP has to end before the scheduled end time of R-TWT1 SP. In at least one embodiment/mode/option the TXOP has to end before the scheduled end time of R-TWT1 SP if the TXOP exceeds the TXOP limit of the primary AC of the TXOP.

During the TXOP time before the scheduled start time of R-TWT1 SP, AP1 follows the current EDCA TXOP rules. For example, AP1 transmits the frames 424 from the primary AC, and receives acknowledgements, shown as BAs 426. In at least one embodiment/mode/option the frames are not allowed to be from the R-TWT1 TIDs.

During R-TWT1 SP, AP1 prioritizes the frame exchange of the R-TWT1 TIDs. As shown in the figure, AP1 transmits a downlink PPDU 428 carrying the frames of R-TWT1 TIDs to STA1, and receives BA 430. The frames of the R-TWT1 TIDs are not from the primary AC of the TXOP. Then, it sends a BSRP 432 to request buffer status of STA1, and receives a buffer status report (BSR) 434. It should be noted that STA1 may only report the buffer status of the R-TWT1 UL TIDs. Then, AP1 triggers 436 a UL PPDU 438 from STA1, and responds to its receipt with BA 440. STA1 may only be allowed to transmit the frames from the R-TWT UL TIDs of R-TWT1, which cannot be from the primary AC.

It should be noted that in at least one embodiment/mode/option during R-TWT1 SP, AP1 is allowed to perform frame exchanges with non-member STAs of R-TWT1.

5.2. Example 2

Figure 10:
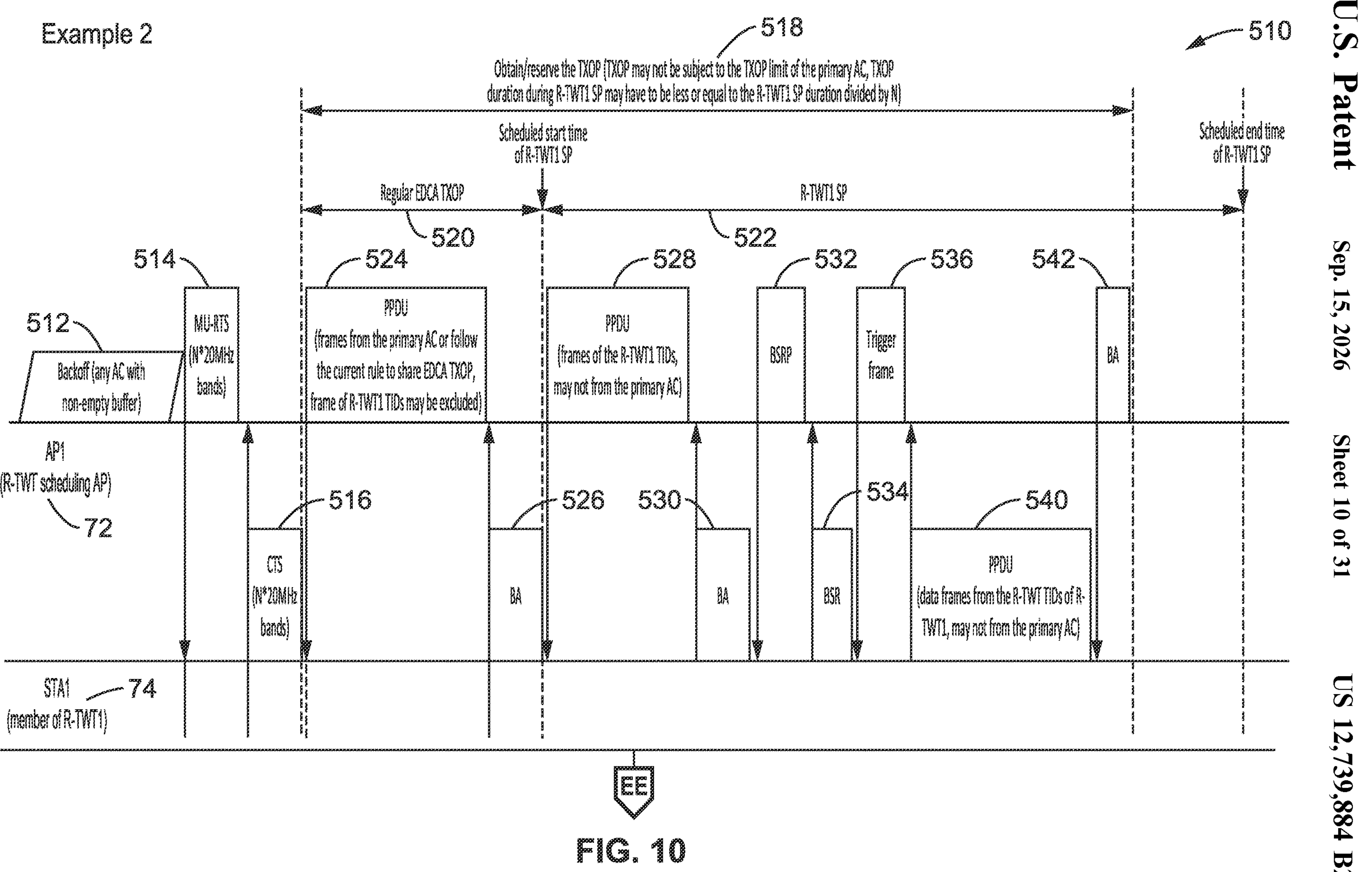
FIG. 10 and FIG. 11 is a communications diagram of Example 2 for R-TWT scheduling according to at least one embodiment of the present disclosure.
Figure 11:
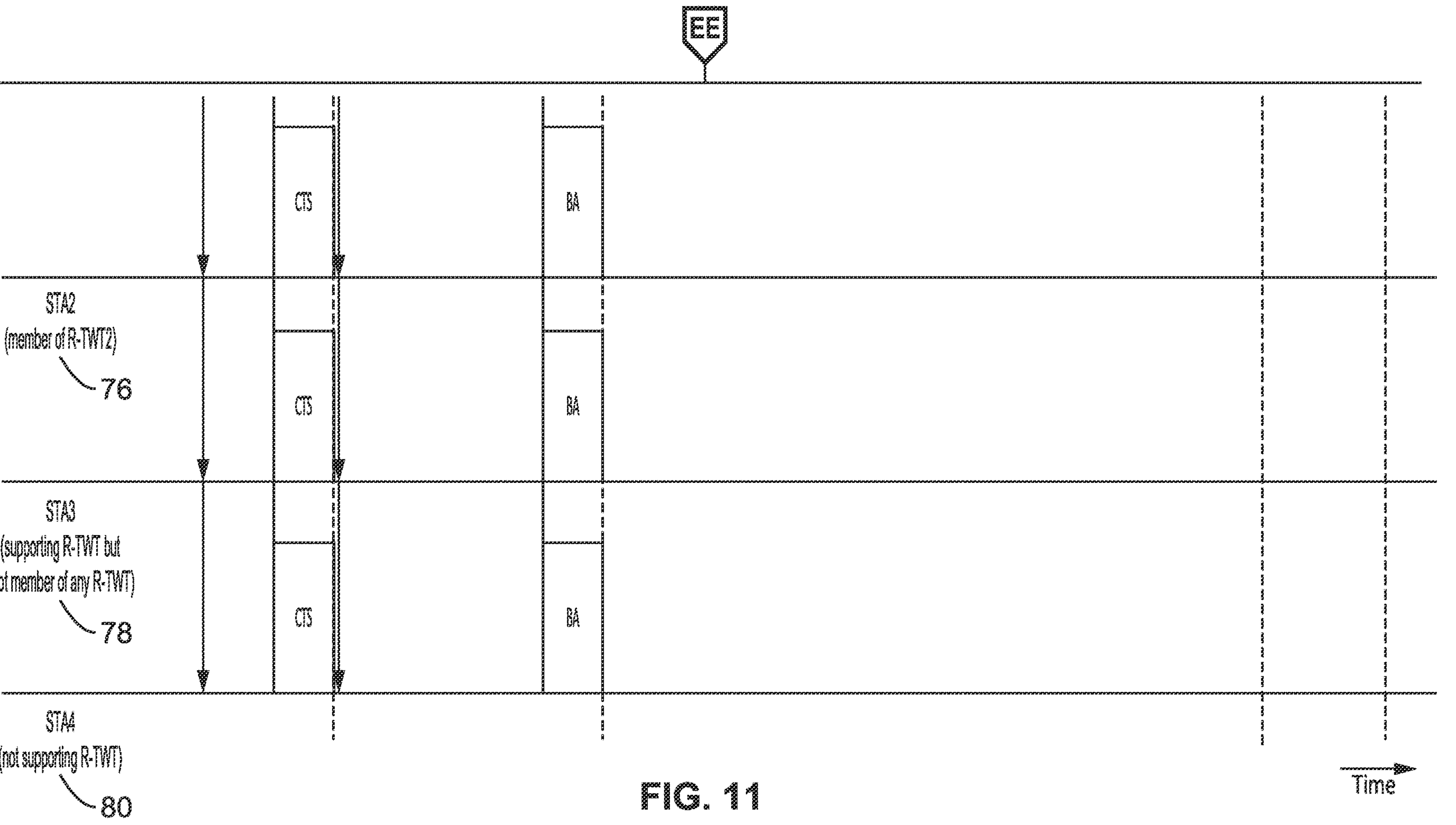

FIG. 10 and FIG. 11 illustrate an example embodiment 510 of TXOP reservation which is subject to R-TWT1 SP duration divided by bandwidth. Again, the figure depicts communications between AP1 72, STA1 74, STA2 76, STA3 78 and STA4 80.

Compared with the example shown in FIG. 8 and FIG. 9, when AP1 initiates MU-RTS/CTS exchange to reserve TXOP, it successfully reserves the N*20 MHz bandwidth. Then, the TXOP time during the R-TWT1 SP cannot be any longer than the R-TWT1 SP duration (the time between the scheduled start time of R-TWT SP1 and the scheduled end time of R-TWT SP1) divided by N.

In particular, the figure depicts AP1 performing backoff 512 to contend for channel access. When AP1 gains channel access, it initiates a MU-RTS/CTS exchange for "N" 20 MHz bandwidths, by sending MU-RTS (N*20 MHz) 514 and receiving CTS (N*20 MHz) 516, to reserve 518 a TXOP.

As shown in the example, the AP reserves 520 the TXOP until the end of the scheduled end time of the R-TWT1 SP 522. The TXOP duration may exceed the TXOP limit of the primary AC of the TXOP. AP1 transmits frames 524 from primary AC, and receives BAs 526.

During R-TWT1 SP, AP1 prioritizes the frame exchange of the R-TWT1 TIDs. As shown in the figure, AP1 transmits a downlink PPDU 528 carrying the frames of R-TWT1 TIDs to STA1, and receives BA 530. The frames of the R-TWT1 TIDs are not from the primary AC of the TXOP. Then, it sends a BSRP 532 to request buffer status of STA1, and receives a buffer status report (BSR) 534. Then, AP1 triggers 536 a UL PPDU 540 from STA1, and responds to its receipt with BA 542.

5.3. Example 3

Figure 12:
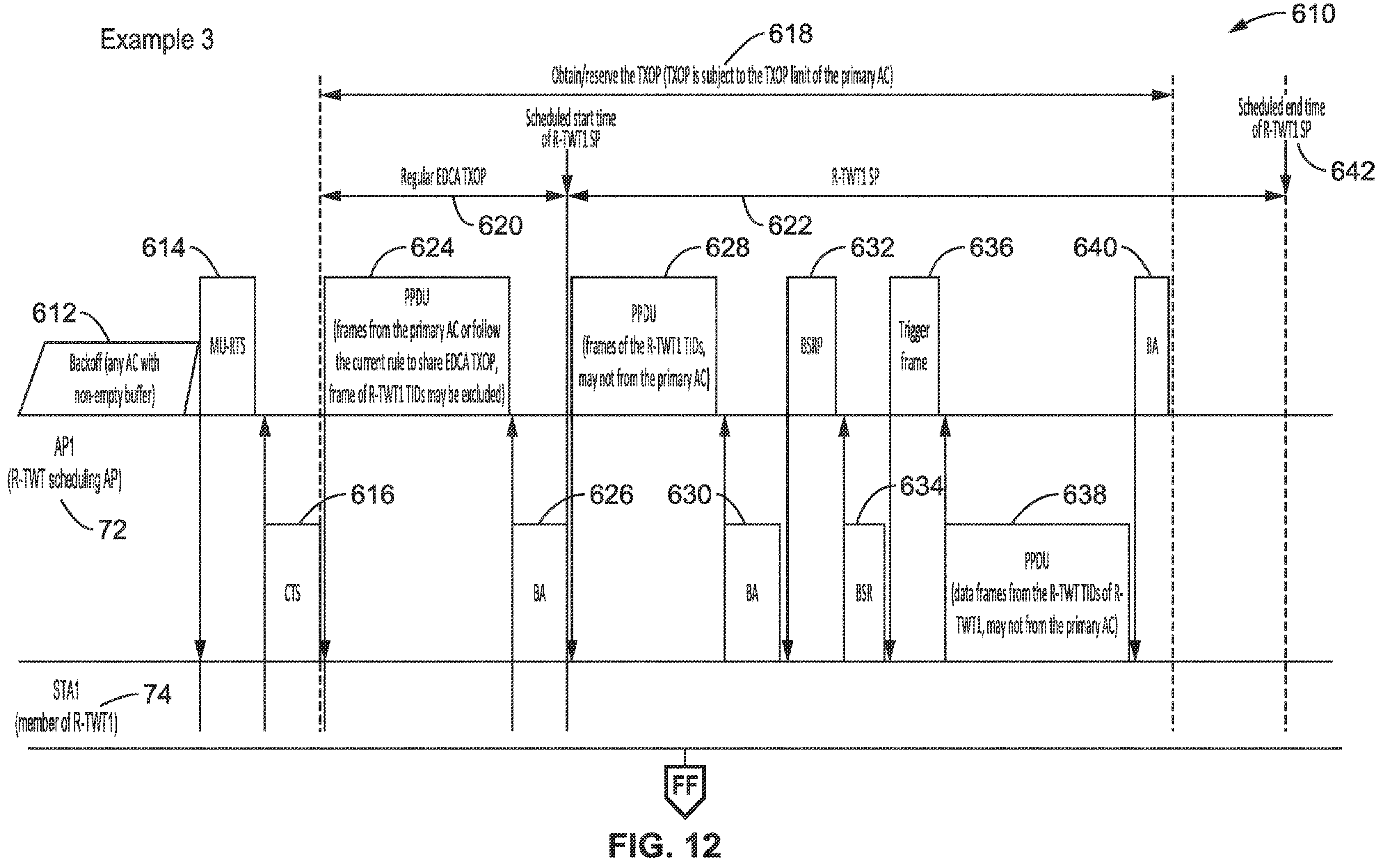
FIG. 12 and FIG. 13 is a communications diagram of Example 3 for R-TWT scheduling according to at least one embodiment of the present disclosure.
Figure 13:
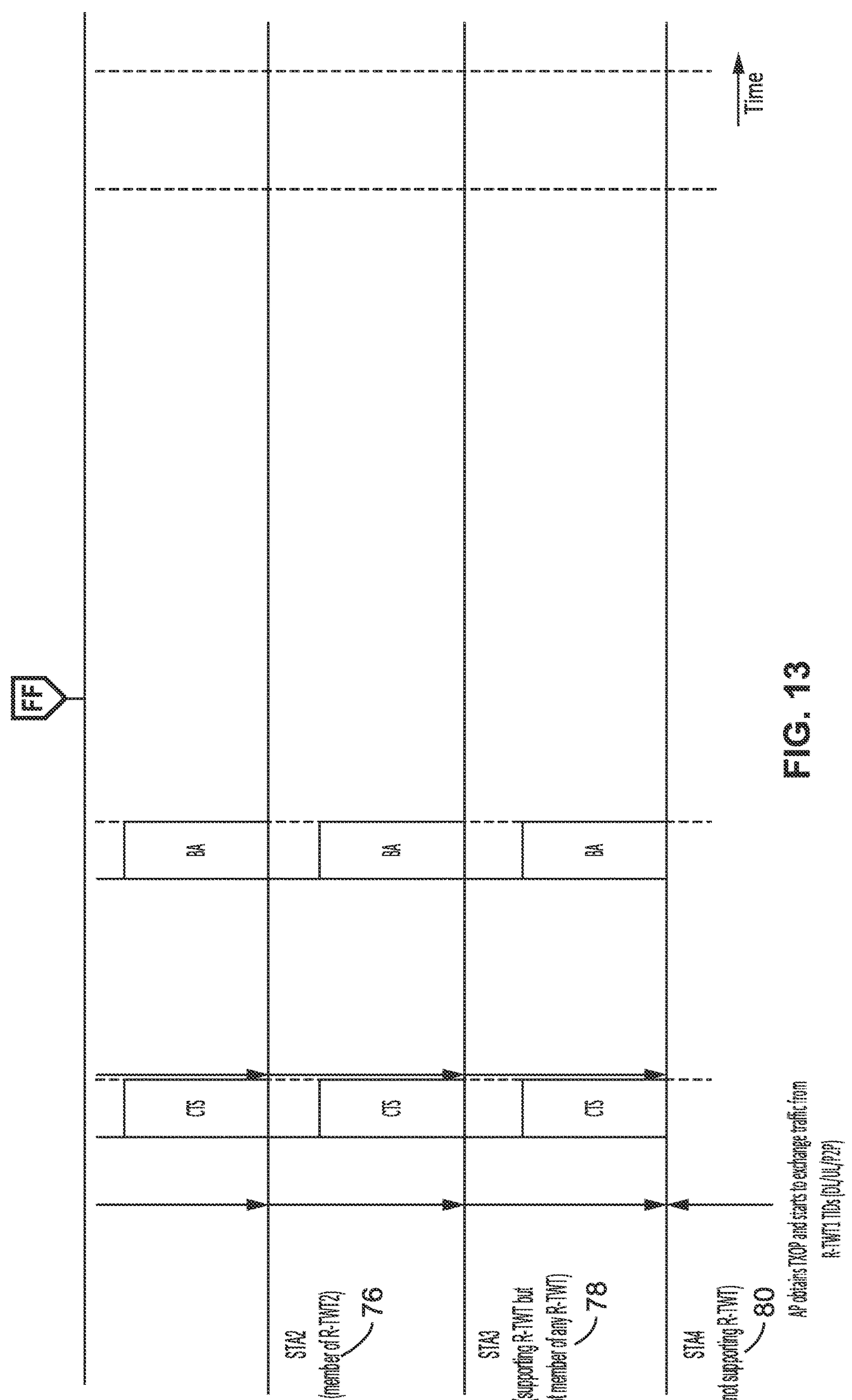

FIG. 12 and FIG. 13 illustrate an example embodiment 610 of TXOP reservation as subject to the TXOP limit of the primary AC. Again, the figure depicts communications between AP1 72, STA1 74, STA2 76, STA3 78 and STA4 80.

Compared with the example shown in FIG. 8 and FIG. 9, when AP1 initiates MU-RTS/CTS exchange to reserve TXOP, the TXOP time cannot exceed the TXOP limit of the primary AC.

In at least one embodiment/mode/option AP1 is allowed to start the frame exchange for the traffic of R-TWT1 TIDs before the scheduled start time of R-TWT1 SP. It should be noted that AP1 may need to ensure that the member STAs of R-TWT1 are awake before it starts the frame exchange for the traffic of R-TWT1 TIDs. Depending on the embodiment/mode/option the above may apply to all examples.

In particular, the figure depicts AP1 performing backoff 612 to contend for channel access. When AP1 gains channel access, it initiates a MU-RTS/CTS exchange, by sending MU-RTS 614 and receiving CTS 616, to reserve 618 a TXOP.

As shown in the example, the AP reserves 618 the TXOP subject to the TXOP limit of the primary AC. In the regular EDCA TXOP period 620, AP1 transmits PPDU frames 624 from the primary AC, and receives BAs 626.

Then during R-TWT1 SP 622, AP1 prioritizes the frame exchange of the R-TWT1 TIDs, and transmits a downlink PPDU 628 carrying the frames of R-TWT1 TIDs to STA1, and receives BA 630. Then AP1 sends a BSRP 632 to request buffer status of STA1, and receives a buffer status report (BSR) 634. Then, AP1 triggers 636 a UL PPDU 638 from STA1, and responds to its receipt with BA 640. It is seen that the R-TWT1 SP extends to its scheduled end time 642, which exceeds that of the TXOP 618.

5.4. Example 4

Figure 14:
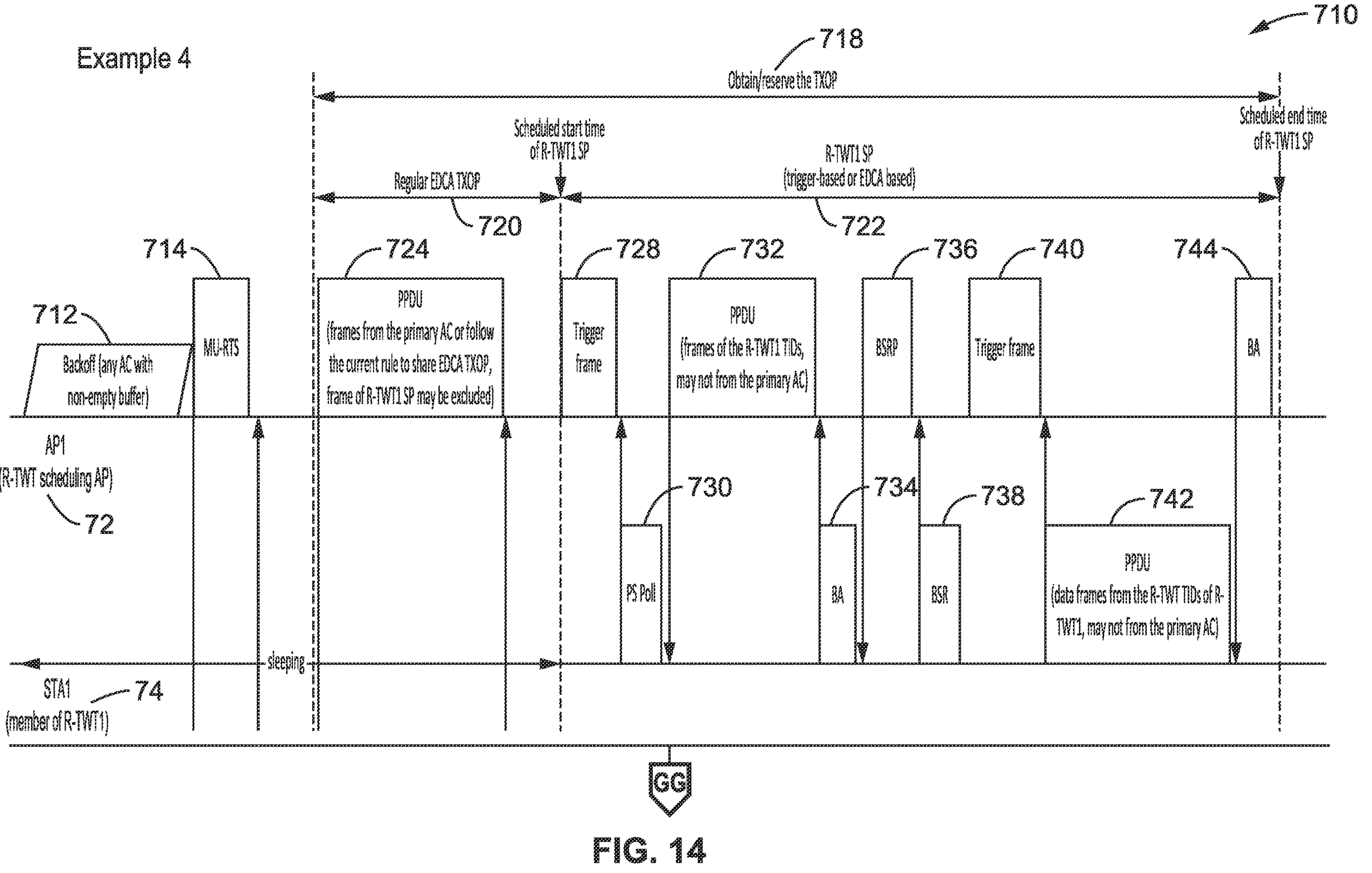
FIG. 14 and FIG. 15 is a communications diagram of Example 4 for R-TWT scheduling according to at least one embodiment of the present disclosure.
Figure 15:
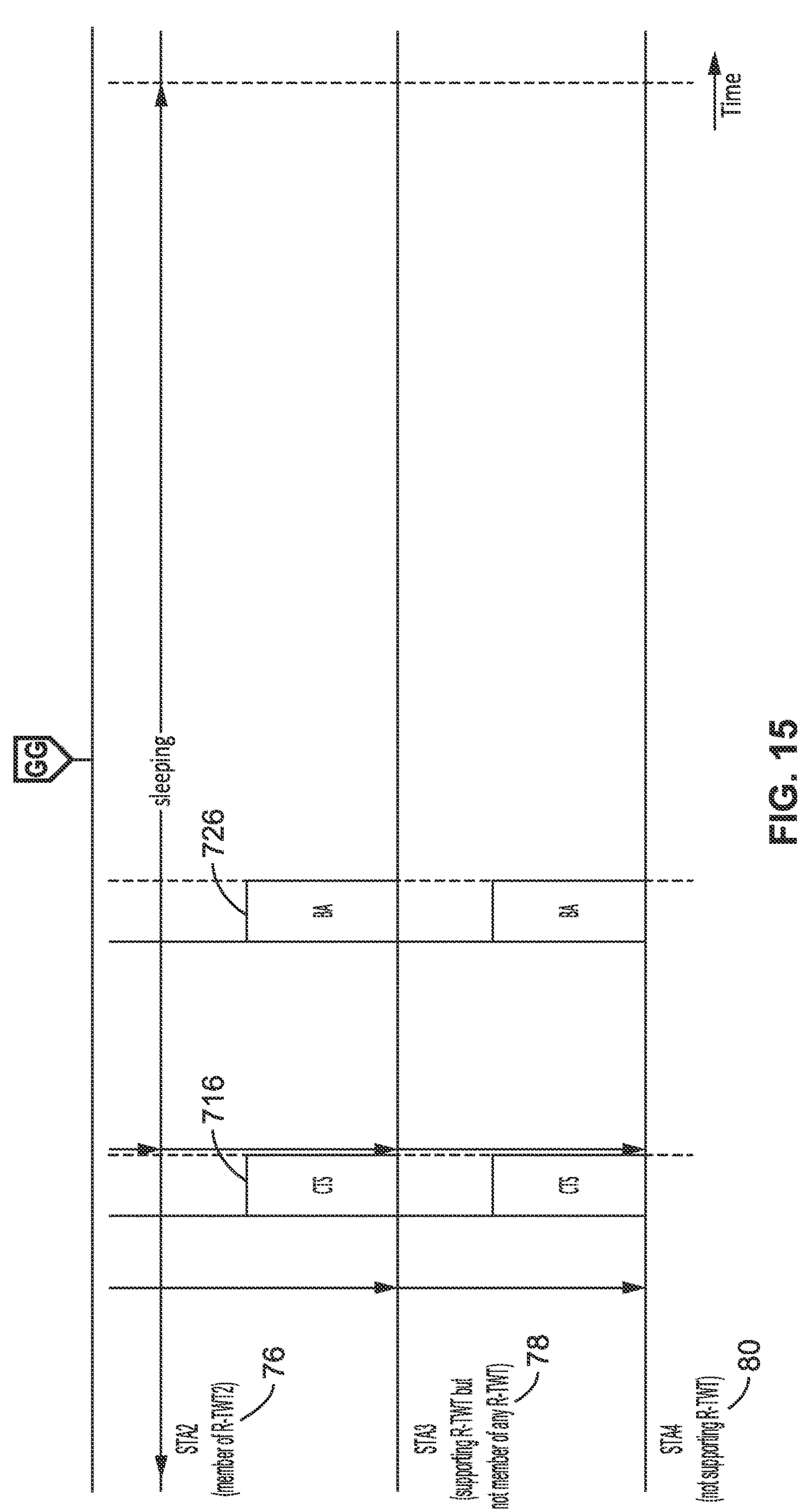

FIG. 14 and FIG. 15 illustrate an example embodiment 710 of member STAs of R-TWT operating in power saving mode. As in the previous figures, communications are depicted between AP1 72, STA1 74, STA2 76, STA3 78 and STA4 80.

Compared with the example shown in FIG. 8 and FIG. 9, when AP1 initiates MU-RTS/CTS exchange to reserve TXOP, it only sends MU-RTS to those STAs (maybe only one STA) which is not in power saving mode, which in this example is STA3 and STA4. When the R-TWT1 SP starts, AP1 initiates a trigger frame or a PS poll frame (or trigger frame/QoS Null frame) exchange to ensure the member STAs of R-TWT1 SP, such as STA1, are awake before starting a frame exchange with the member STAs of R-TWT1 SP.

In particular, the figure depicts AP1 performing backoff 712 to contend for channel access, gaining channel access and initiating a MU-RTS/CTS exchange, by sending MU-RTS 714 and receiving CTS 716 from STA2 and STA3, since STA1 is asleep, to reserve 718 a TXOP.

In the regular EDCA TXOP period 720, AP1 transmits frames 724 from the primary AC, and receives BAs 726 from STA2 and STA3.

Then during R-TWT1 SP 722, AP1 transmits a trigger frame 728 and receive PS Poll 730 from STA1. AP1 sends PPDU 732 to STA1 and receives BA 734. AP1 then sends BSRP 736 to request buffer status of STA1, and receives a buffer status report (BSR) 738. Then, AP1 send trigger frame 740, which triggers STA1 PPDU 742 to AP1, which AP1 acknowledges with BA 744.

5.5. Example 5

Figure 16:
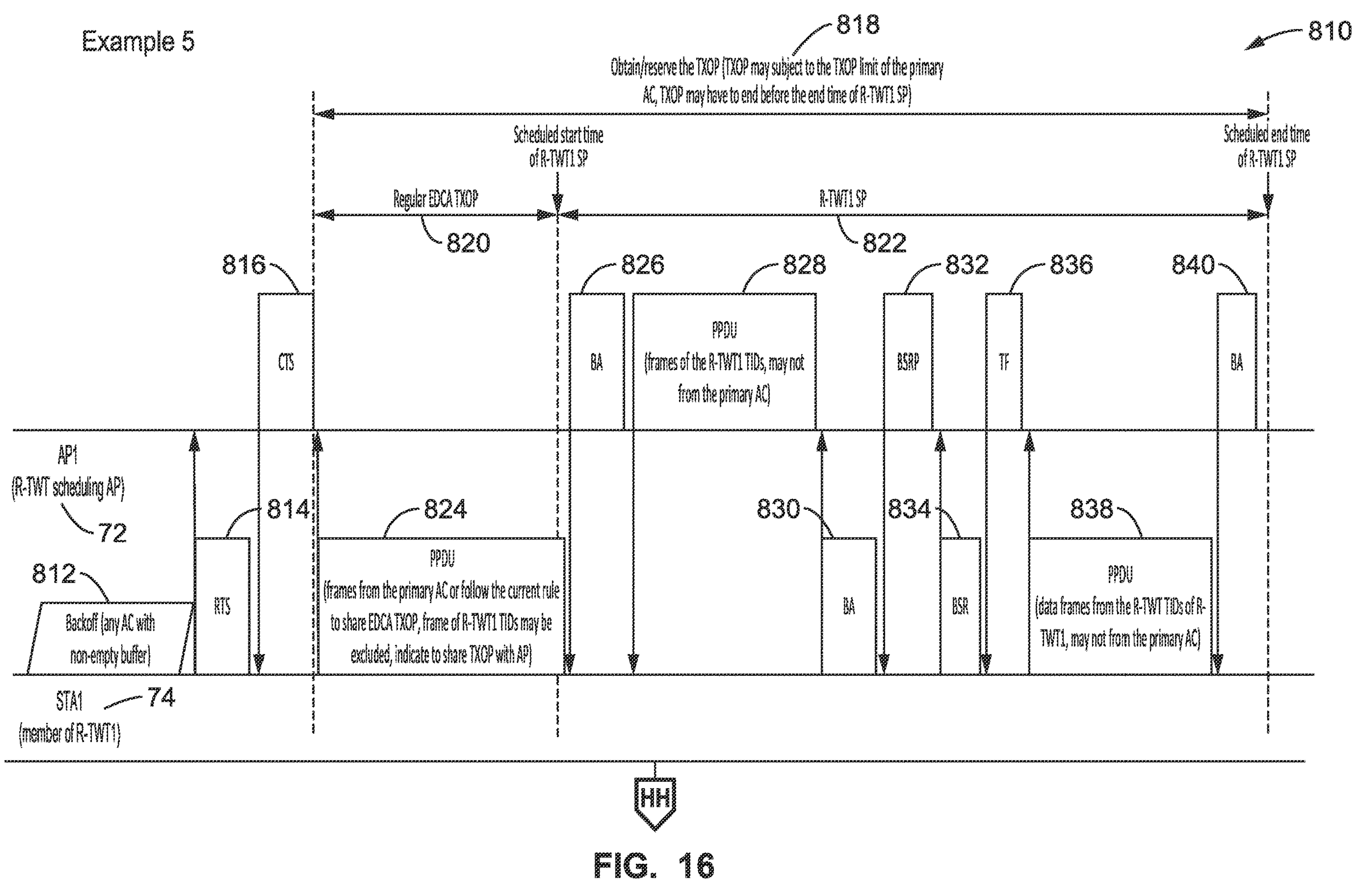
FIG. 16 and FIG. 17 is a communications diagram of Example 5 for R-TWT scheduling according to at least one embodiment of the present disclosure.
Figure 17:
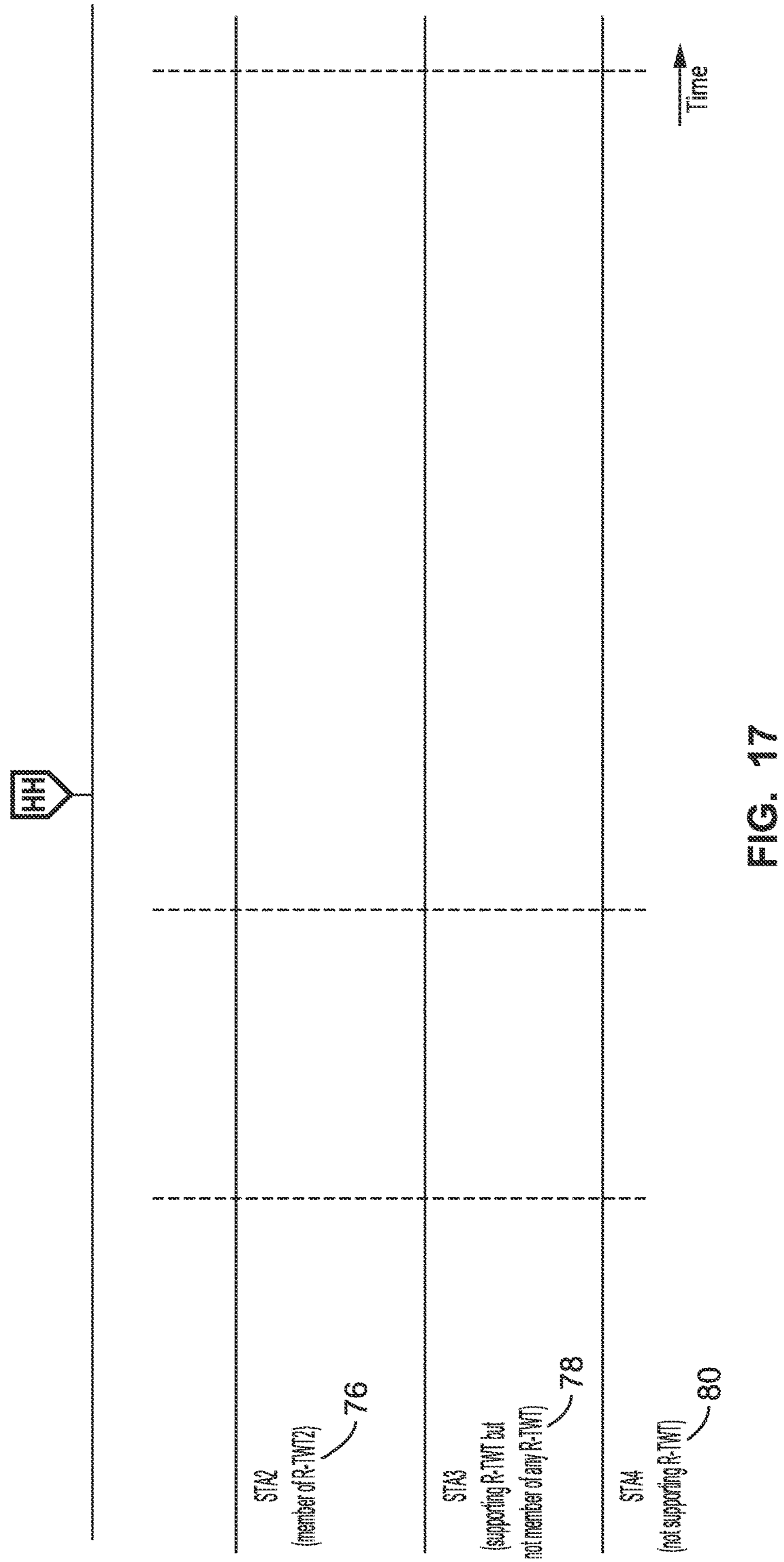

FIG. 16 and FIG. 17 illustrate an example embodiment 810 of an R-TWT member STA reserving TXOP for R-TWT SP before the scheduled start time of the R-TWT SP. As in the previous figures, communications are depicted between AP1 72, STA1 74, STA2 76, STA3 78 and STA4 80.

Compared with Example 1, STA1 gains channel access after Backoff (BO) 812, before the scheduled start time of R-TWT1 SP 822. STA1 initiates RTS/CTS frame exchange, sending RTS 814 and receiving a CTS 816 from AP1, to reserve the TXOP 818 until the scheduled end time of R-TWT1 SP. During the TXOP portion 820 before the scheduled start time of R-TWT1 SP, STA1 is able to transmit the PPDU 824 according to the current EDCA TXOP rule. It is seen in the figure that PPDU 824 along with the BA response 826 from AP1 extend into the R-TWT1-SP 822. In this example, STA1 has transmitted frames from the primary AC of the TXOP. Before the scheduled start time, STA1 sends a PPDU indicating that it will share the TXOP with the AP and allows the AP to behave (operate) as the TXOP holder. It should be noted that this PPDU may have to start transmitting before the scheduled start time of R-TWT1 SP.

Then, AP1 behaves as the TXOP holder and prioritizes the frame exchanges of the R-TWT1 TIDs during the shared TXOP as shown Example 1. In particular, AP1 transmits a downlink PPDU 828 carrying the frames of R-TWT1 TIDs to STA1, and receives BA 830. Then, AP1 sends a BSRP 832 to request buffer status of STA1, and receives a buffer status report (BSR) 834. Then, AP1 sends a trigger frame 836, in response to which STA1 sends PPDU 838, to which AP1 responds with BA 840.

In at least one embodiment/mode/option the TXOP time reserved by STA1 is subject to the TXOP limit of the primary AC. That is, STA1 may not be able to reserve TXOP until the scheduled end time of R-TWT1 SP due to TXOP limit of the primary AC.

In at least one embodiment/mode/option the TXOP time reserved by STA1 is not subject to the TXOP limit of the primary AC.

In at least one embodiment/mode/option the TXOP time reserved by STA1 has to end before the scheduled end time of R-TWT1 SP.

In at least one embodiment/mode/option the other STAs that are not member STAs of R-TWT1, such as STA2 and STA3, can be allowed to operate in the same manner as STA1 shown in the figure.

In at least one embodiment/mode/option the PPDU indicating TXOP sharing with the AP can carry a frame similar to MU-RTS transmission frame as defined in IEEE 802.11be. Then, the frame sent in response to the MU-RTS transmission frame is a CTS instead of a BA/ACK as shown in the figure.

In at least one embodiment/mode/option the frame indicating TXOP sharing with the AP is a CTS frame with a Receiver Address (RA) field set to the AP MAC address (or other special address that is shared between the AP and all the member STAs of the same R-TWT). Then, the AP may not need to send a frame in response to the CTS frame; whereby the BA/ACK in response to the frame indicating TXOP sharing with the AP as shown in the figure is not needed.

In at least one embodiment/mode/option the frame indicating TXOP sharing with AP is a Reverse Direction Grant (RDG) frame.

5.6. Example 6

Figure 18:
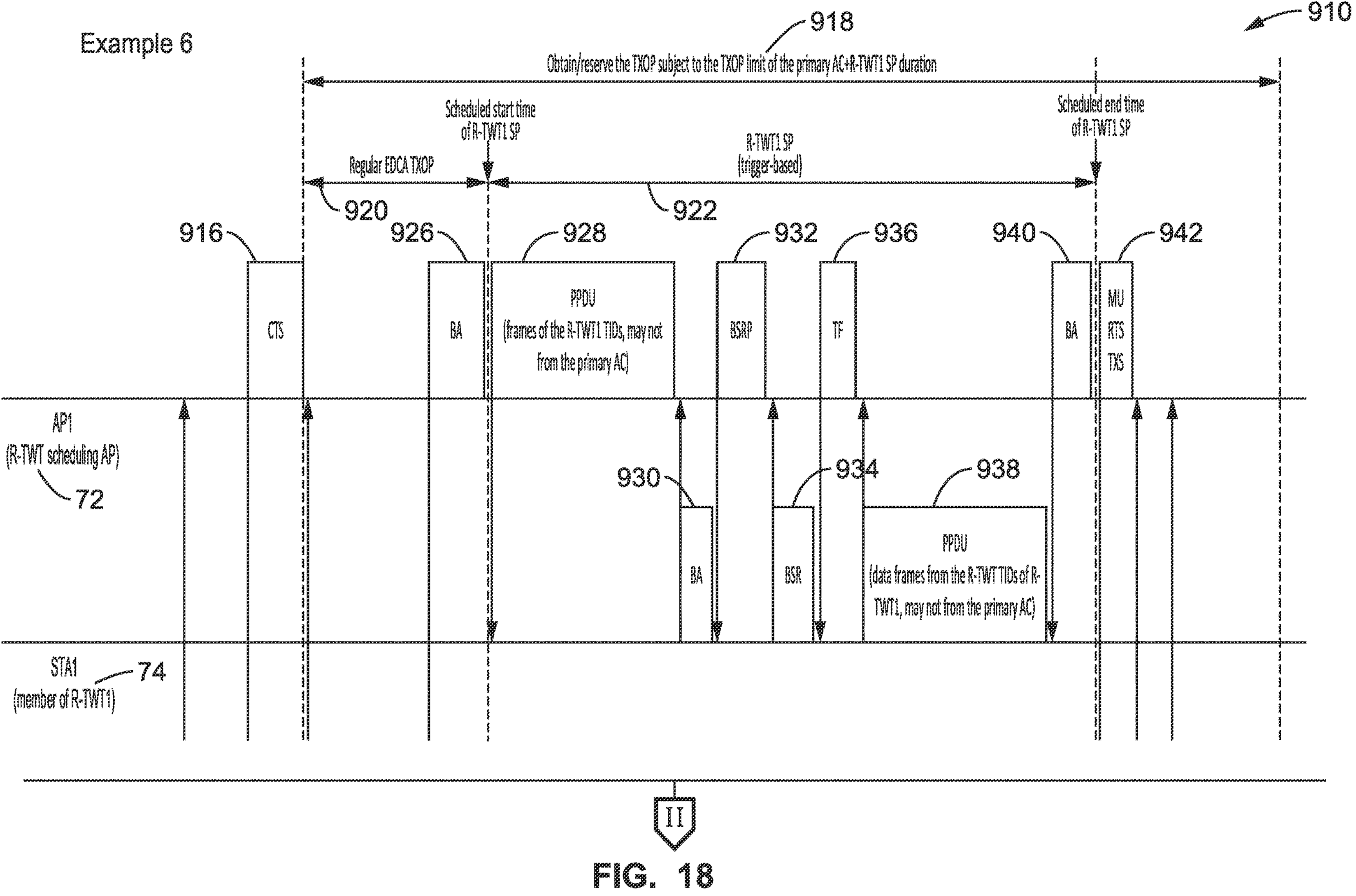
FIG. 18 and FIG. 19 is a communications diagram of Example 6 for R-TWT scheduling according to at least one embodiment of the present disclosure.
Figure 19:
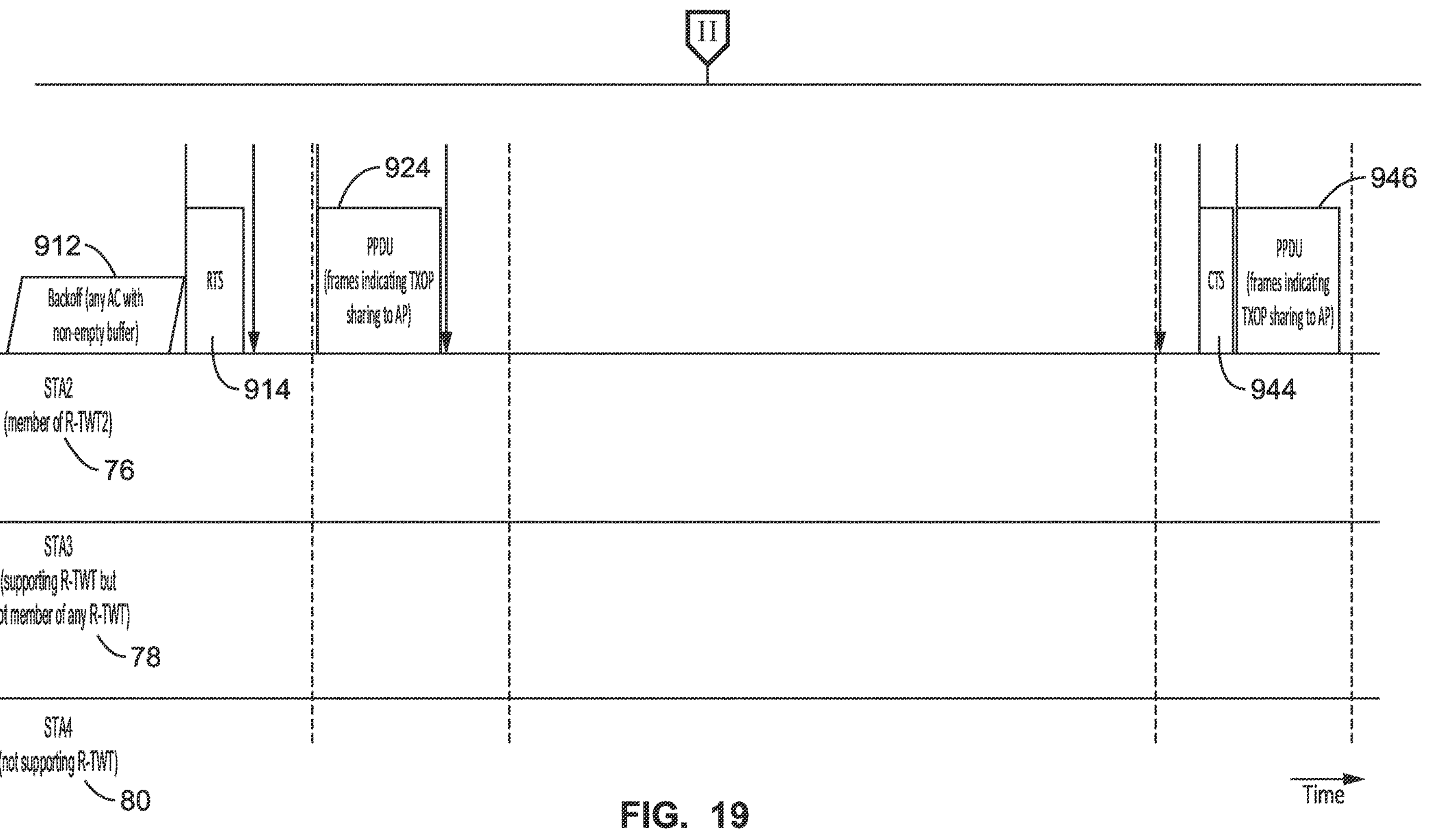

FIG. 18 and FIG. 19 illustrate an example embodiment 910 of reserving the TXOP, as subject to the TXOP limit+R-TWT SP duration. It should be noted that this restriction may apply to the AP and other STAs. As in the previous figures, communications are depicted between AP1 72, STA1 74, STA2 76, STA3 78 and STA4 80.

Compared with Example 5, in this case STA2 after BO 912, gains channel access before the scheduled start time of R-TWT1 SP 918. STA2 initiates RTS/CTS frame exchange, sending RTS 914 and receiving CTS 916 from AP1, to reserve the TXOP beyond the scheduled end time of R-TWT1 SP. However, the TXOP duration cannot exceed the TXOP limit of the primary AC plus the R-TWT1 SP duration. During the TXOP before the scheduled start time of R-TWT1 SP, STA2 is able to transmit PPDU 924 according to the current EDCA TXOP rule, and it receives BA 926 from AP1. For example, STA2 may transmit frames from the primary AC of the TXOP. Thus, before the scheduled start time, STA2 sends a PPDU indicating that it will share the TXOP with AP1 and allows AP1 to behave (operate) as the TXOP holder.

Then, AP1 behaves as the TXOP holder and prioritizes the frame exchanges of the R-TWT1 TIDs during the shared TXOP as shown in Example 1. In particular, AP1 transmits a downlink PPDU 928 and receives BA 930. Then AP1 sends a BSRP 932 to request buffer status of STA1, and receives a buffer status report (BSR) 934. Then, AP1 triggers 936 PPDU 938 from STA1, and responds to its receipt with BA 940.

After the scheduled end time of R-TWT1 SP, AP1 sends a MU-RTS TXS frame 942 to STA2 to return the TXOP to STA2. After STA2 sends CTS 944 in response to the MU-RTS TXS frame, STA2 becomes the TXOP holder again, and is seen sending a PPDU 946 to AP1.

5.7. Example 7

Figure 20:
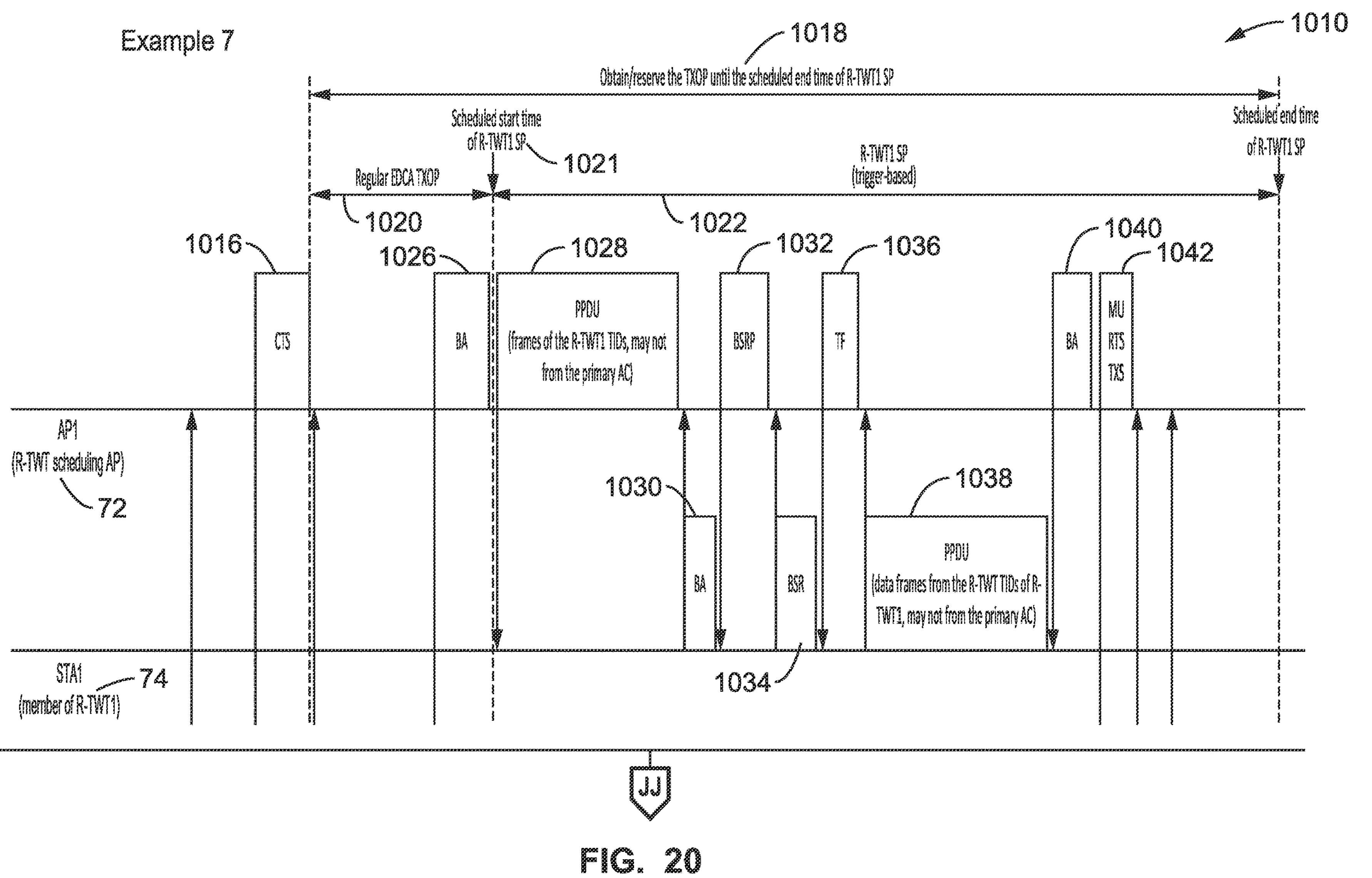
FIG. 20 and FIG. 21 is a communications diagram of Example 7 for R-TWT scheduling according to at least one embodiment of the present disclosure.
Figure 21:
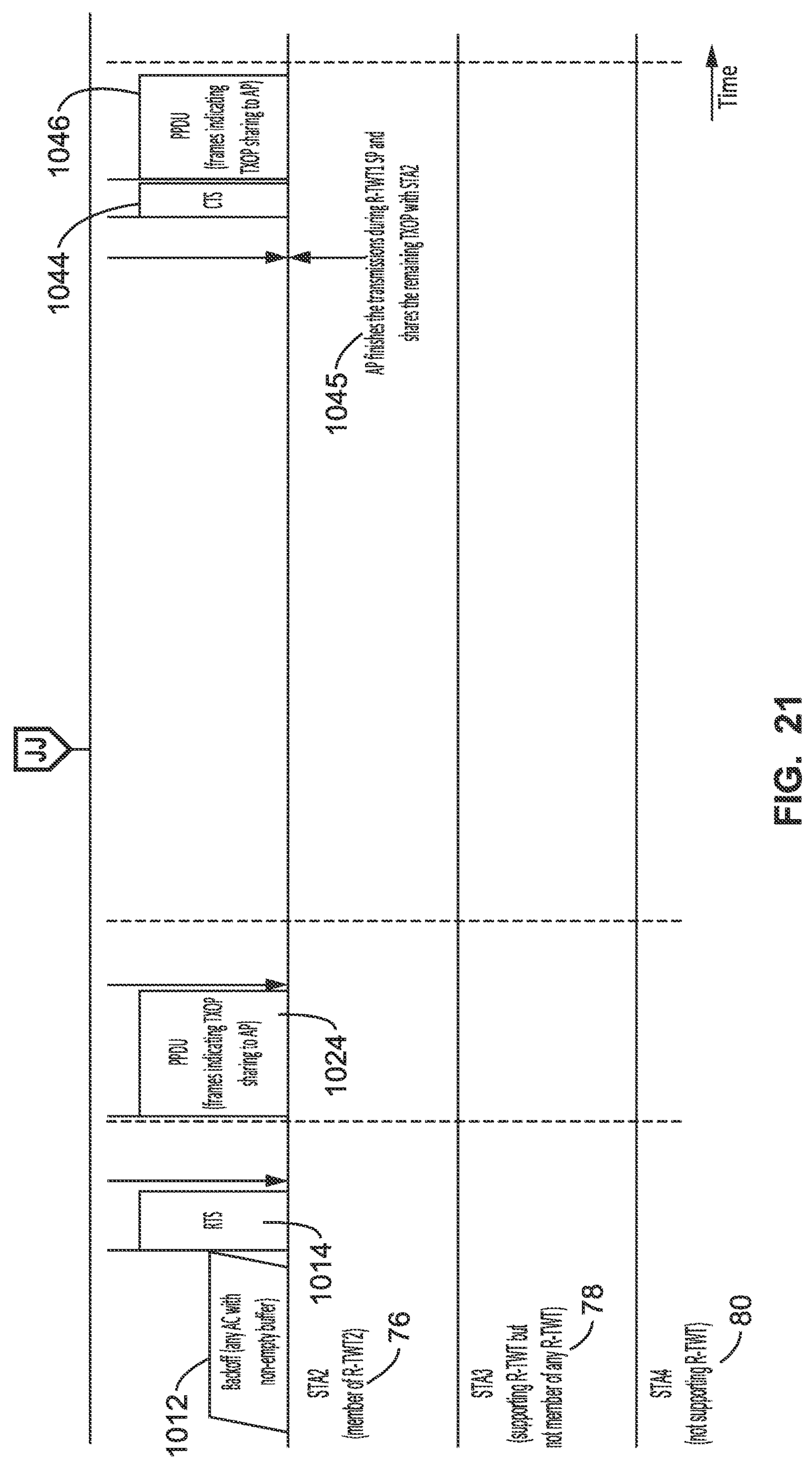

FIG. 20 and FIG. 21 illustrate an example embodiment 1010 of the AP finishing a frame exchange of R-TWT1 TIDs before the scheduled end time of R-TWT1 SP. As in the previous figures, communications are depicted between AP1 72, STA1 74, STA2 76, STA3 78 and STA4 80.

Compared with Example 5, STA2 gains channel access, after BO 1012, before the scheduled start time of R-TWT1 SP 1018. STA2 initiates RTS/CTS frame exchange, sending RTS 1014 and receiving CTS 1016 from AP1. During the TXOP, before the scheduled start time of R-TWT1 SP, STA2 is able to transmit PPDU 1024 according to the current EDCA TXOP rule, and receive BA 1026. In the example STA2 transmits a PPDU indicating that it shares the TXOP with AP1 and allows AP1 to behave (operate) as the TXOP holder.

Then, AP1 behaving as the TXOP holder, prioritizes the frame exchanges of the R-TWT1 TIDs during the shared TXOP as shown Example 1. In particular, AP1 transmits a downlink PPDU 1028 and receives BA 1030. Then AP1 sends a BSRP 1032 to request buffer status of STA1, and receives a buffer status report (BSR) 1034. Then, AP1 triggers 1036 PPDU 1038 from STA1, and responds to its receipt with BA 1040.

AP1 finishes the frame exchange of R-TWT1 TIDs during the R-TWT1 SP, by sending a MU-RTS TXS frame 1042 to STA2 to return 1045 the TXOP to STA2. After STA2 sends CTS 1044 in response to the MU-RTS TXS frame, STA2 again operates as the TXOP holder, and is seen sending PPDU 1046.

Figure 22:
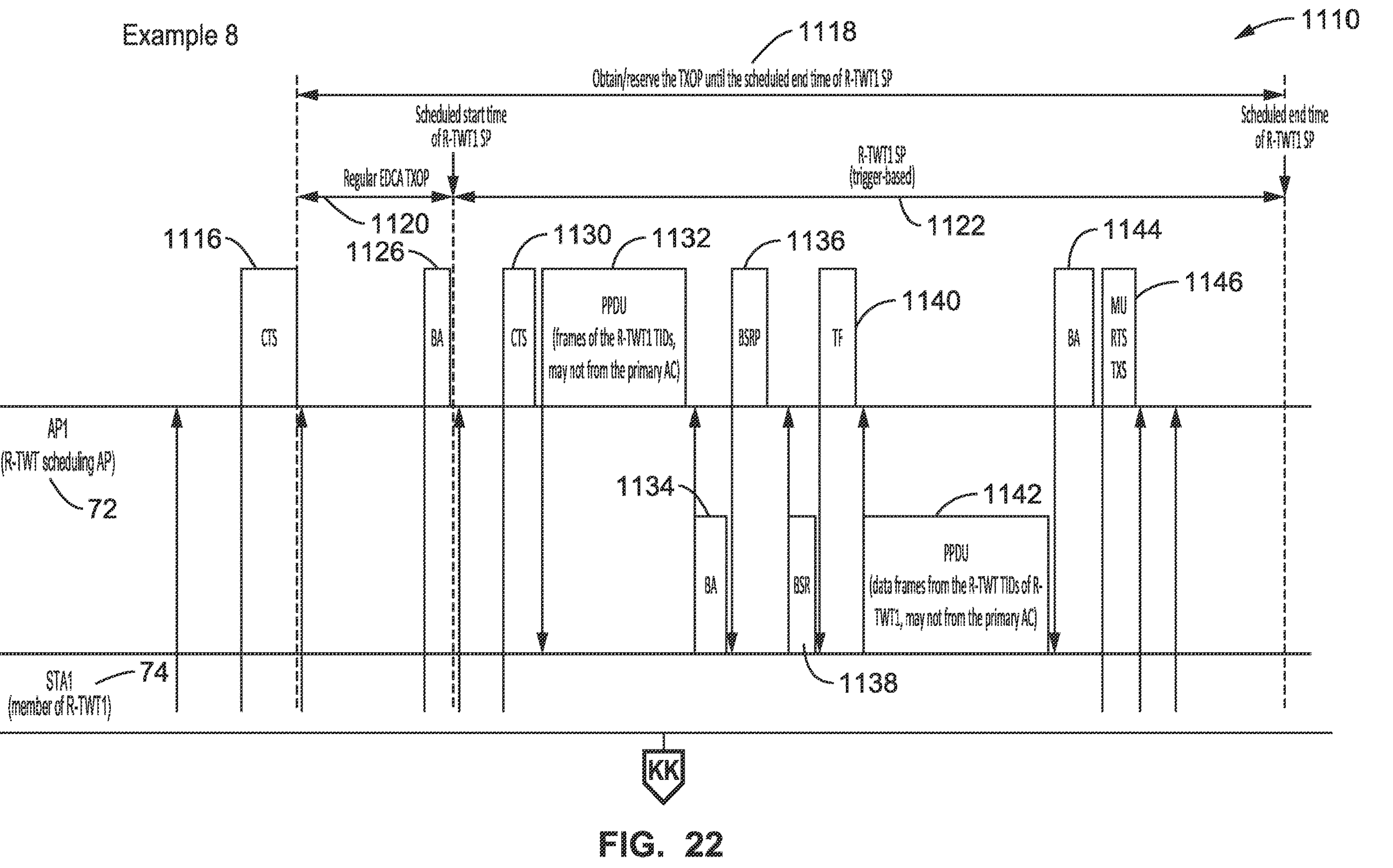
FIG. 22 and FIG. 23 is a communications diagram of Example 8 for R-TWT scheduling according to at least one embodiment of the present disclosure.
Figure 23:
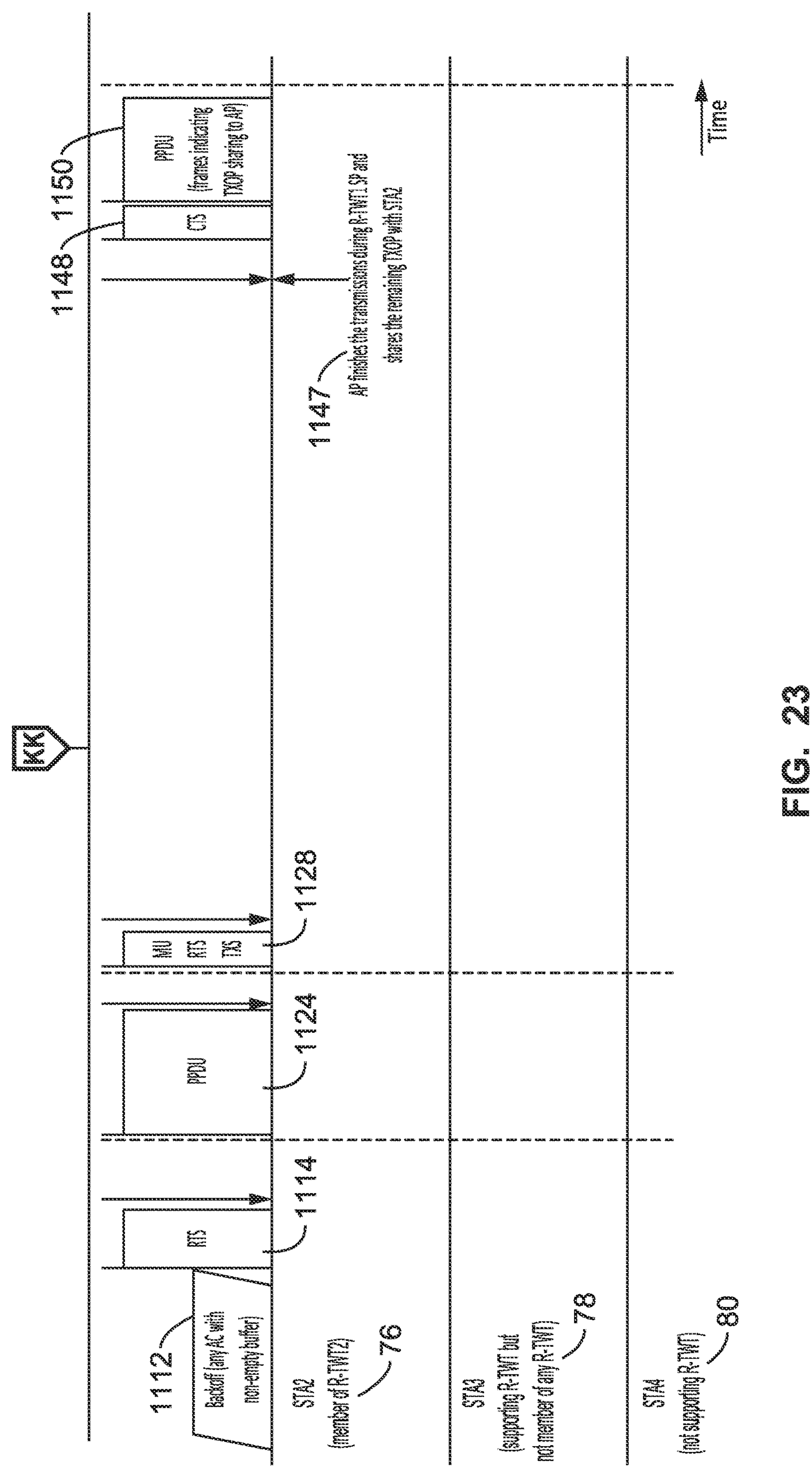

FIG. 22 and FIG. 23 illustrate an example embodiment 1110 of a non-AP STA sharing TXOP using a MU-RTS TXS frame. As in the previous figures, communications are depicted between AP1 72, STA1 74, STA2 76, STA3 78 and STA4 80.

5.8. Example 8

This figure is similar to Example 7, with STA2 gaining channel access, after BO 1112, during the regular EDCA TXOP 1120, before the scheduled start time of R-TWT1 SP 1118. STA2 initiates RTS/CTS frame exchange, sending RTS 1114 and receiving CTS 1116 from AP1. During the TXOP, before the scheduled start time of R-TWT1 SP 1122, STA2 is able to transmit PPDU 1124 according to the current EDCA TXOP rule, and receives BA 1126 from AP1. In the example STA2 transmits a PPDU indicating that it will share the TXOP with AP1 and allows AP1 to behave (operate) as the TXOP holder.

STA2 sends a MU-RTS TXS frame 1128 at the scheduled start time of R-TWT1 SP to share the TXOP with AP1 and allows AP1 to behave (operate) as the TXOP holder during R-TWT1 SP 1122. The AP responds to the MU-RTS TXS with CTS 1130.

Then AP1 is seen performing the actions as described for Example 7, transmitting a downlink PPDU 1132 and receiving BA 1134 from STA1. Then AP1 sends a BSRP 1136 to request buffer status of STA1, and receives a buffer status report (BSR) 1138. Then, AP1 triggers 1140 PPDU 1142 from STA1, and responds to its receipt with BA 1144.

AP1 finishes the frame exchange of R-TWT1 TIDs during the R-TWT1 SP, by sending a MU-RTS TXS frame 1146 to STA2 to return 1147 the TXOP to STA2. After STA2 sends CTS 1148 in response to the MU-RTS TXS frame, then STA2 becomes the TXOP holder again, and is seen sending PPDU 1150.

5.9. Example 9

Figure 24:
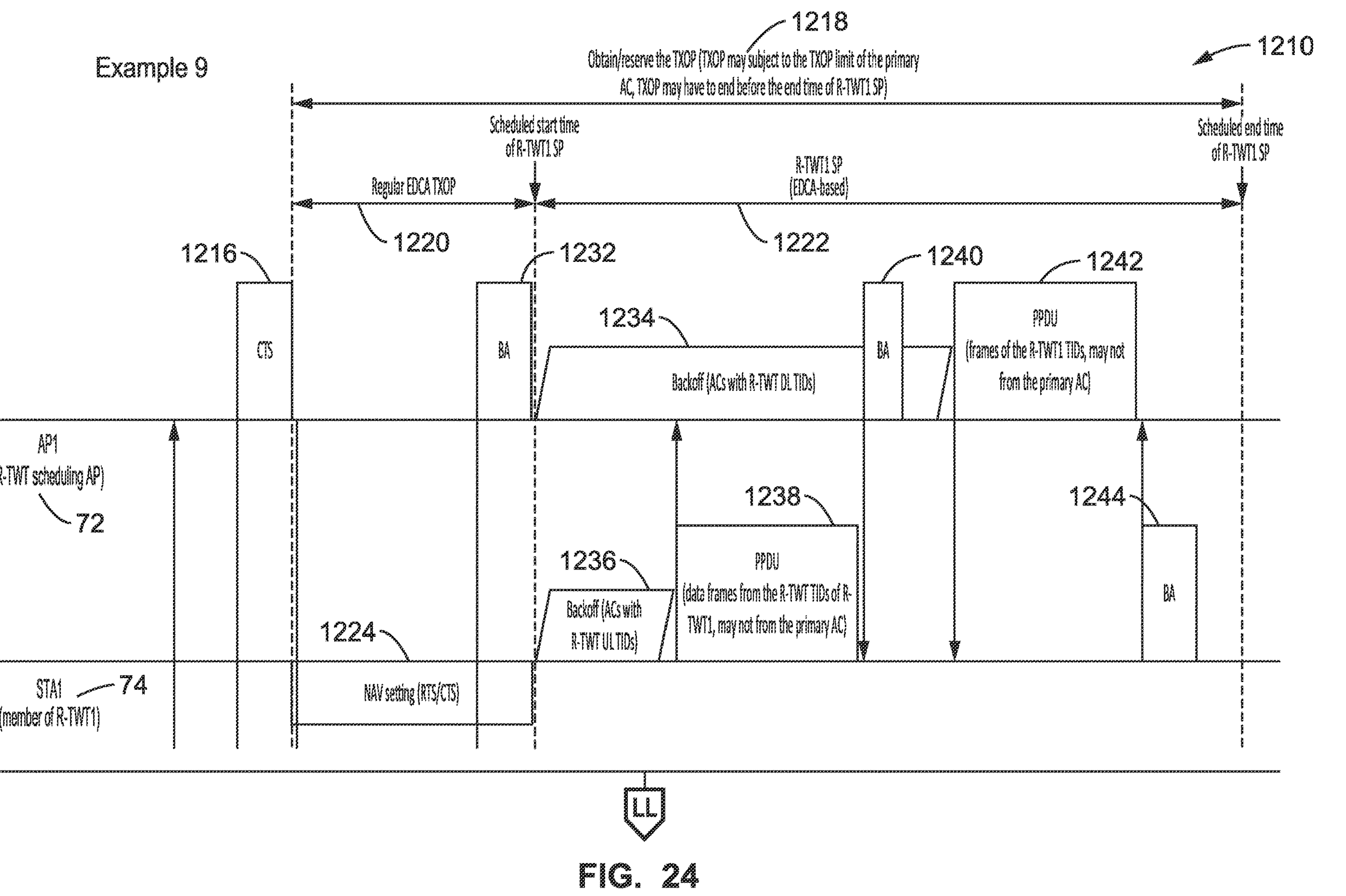
FIG. 24 and FIG. 25 is a communications diagram of Example 9 for R-TWT scheduling according to at least one embodiment of the present disclosure.
Figure 25:
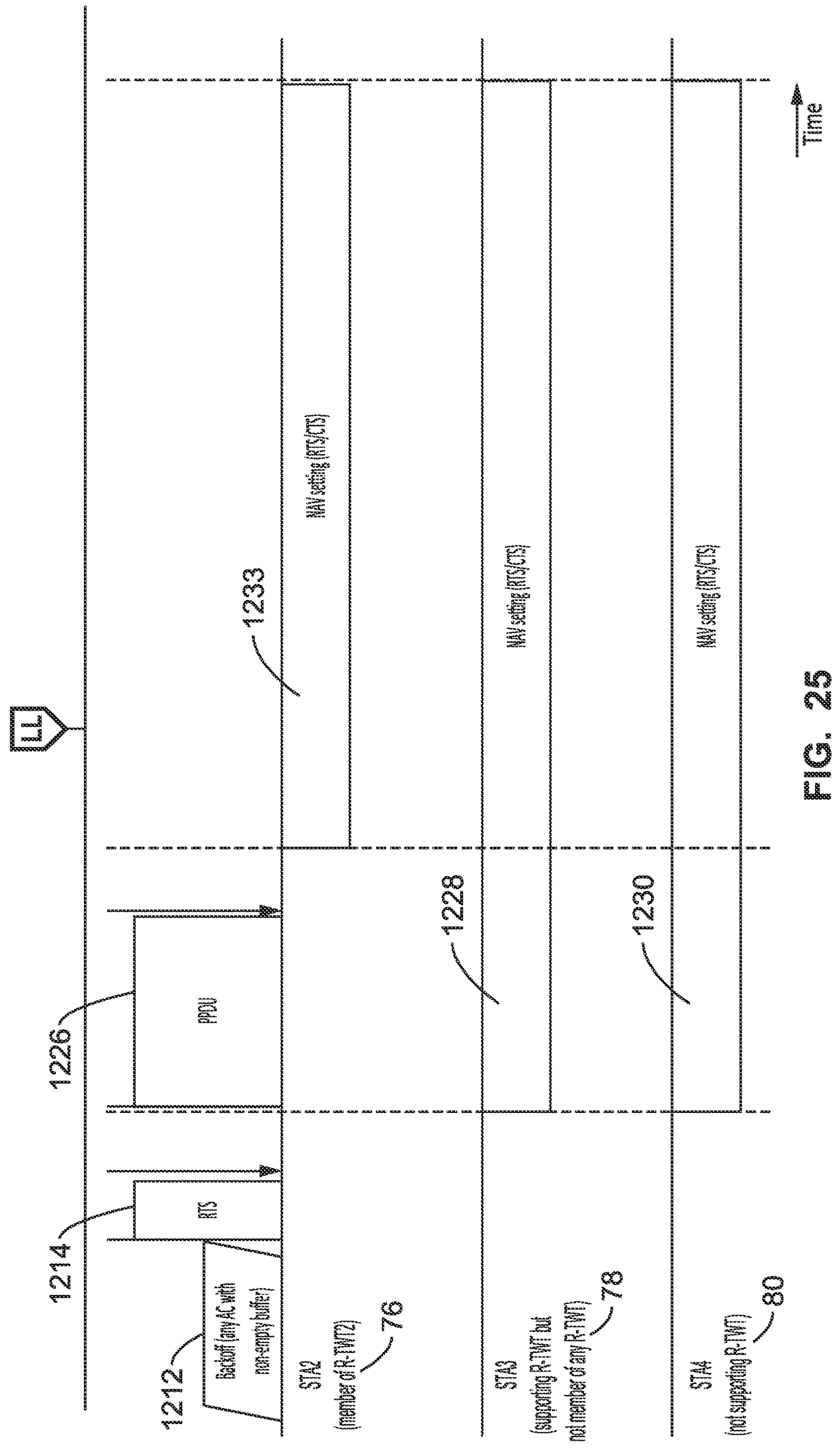

FIG. 24 and FIG. 25 illustrate an example embodiment 1210 of an EDCA based R-TWT SP. As in the previous figures, example communications are depicted between AP1 72, STA1 74, STA2 76, STA3 78 and STA4 80.

STA2 gains channel access after BO 1212, and reserves the TXOP 1218 until the scheduled end time of R-TWT1 SP 1222 as shown in Example 8. STA2 transmits RTS 1214 and receives CTS 1216 from AP1. In response to CTS 1216, STA3 and STA4 set NAV 1228, 1230, according to the RTS/CTS exchange; while STA1 only sets NAV 1224 until the scheduled start time of R-TWT1 SP 1222.

Then, STA2 transmits PPDUs 1226 during the TXOP time before the scheduled start time of R-TWT1 SP, and receives BA 1232. Then, STA2 sets its NAV 1233 during the R-TWT1 SP.

AP1 and STA1 start to contend for the channel with BOs 1234, 1236, respectively. In at least one embodiment/mode/option AP1 may only be allowed to use the EDCAFs of the ACs corresponding to the R-TWT DL TIDS of R-TWT1. STA1 may only be allowed to use the EDCAFs of the ACs corresponding to the R-TWT UL TIDs of <R-TWT1 TIDs, STA1>.

When AP1 or STA1 gain the channel, they can transmit the frames of R-TWT1 TIDs. In the example, STA1 is seen obtaining the channel and sending PPDU 1238 during BO 1234 of AP1. AP1 responds with BA 1240 to PPDU 1238. Then AP1 is seen sending PPDU 1242 to STA1 and receiving a BA 1244.

5.10. Example 10

Figure 26:
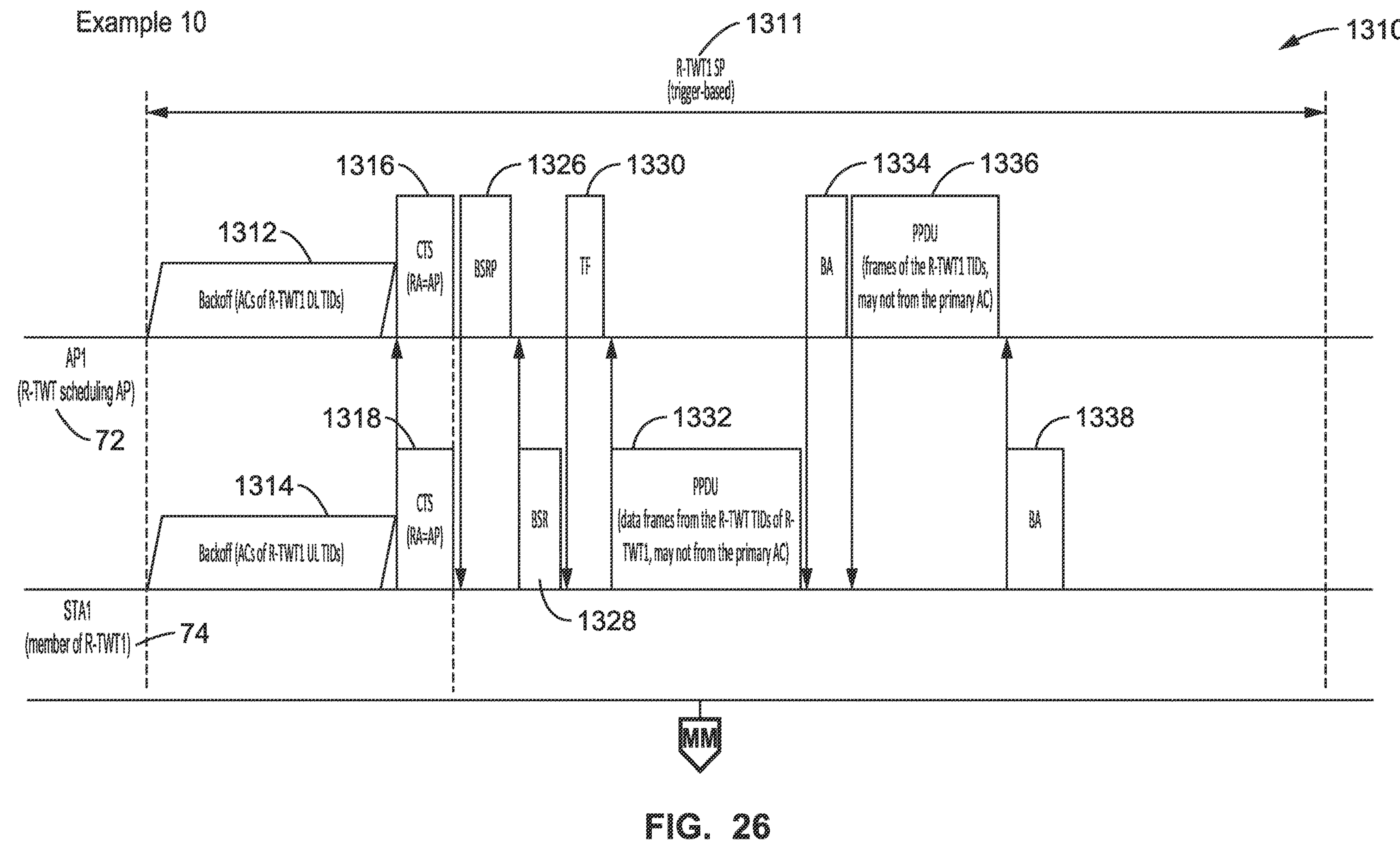
FIG. 26 and FIG. 27 is a communications diagram of Example 10 for R-TWT scheduling according to at least one embodiment of the present disclosure.
Figure 27:
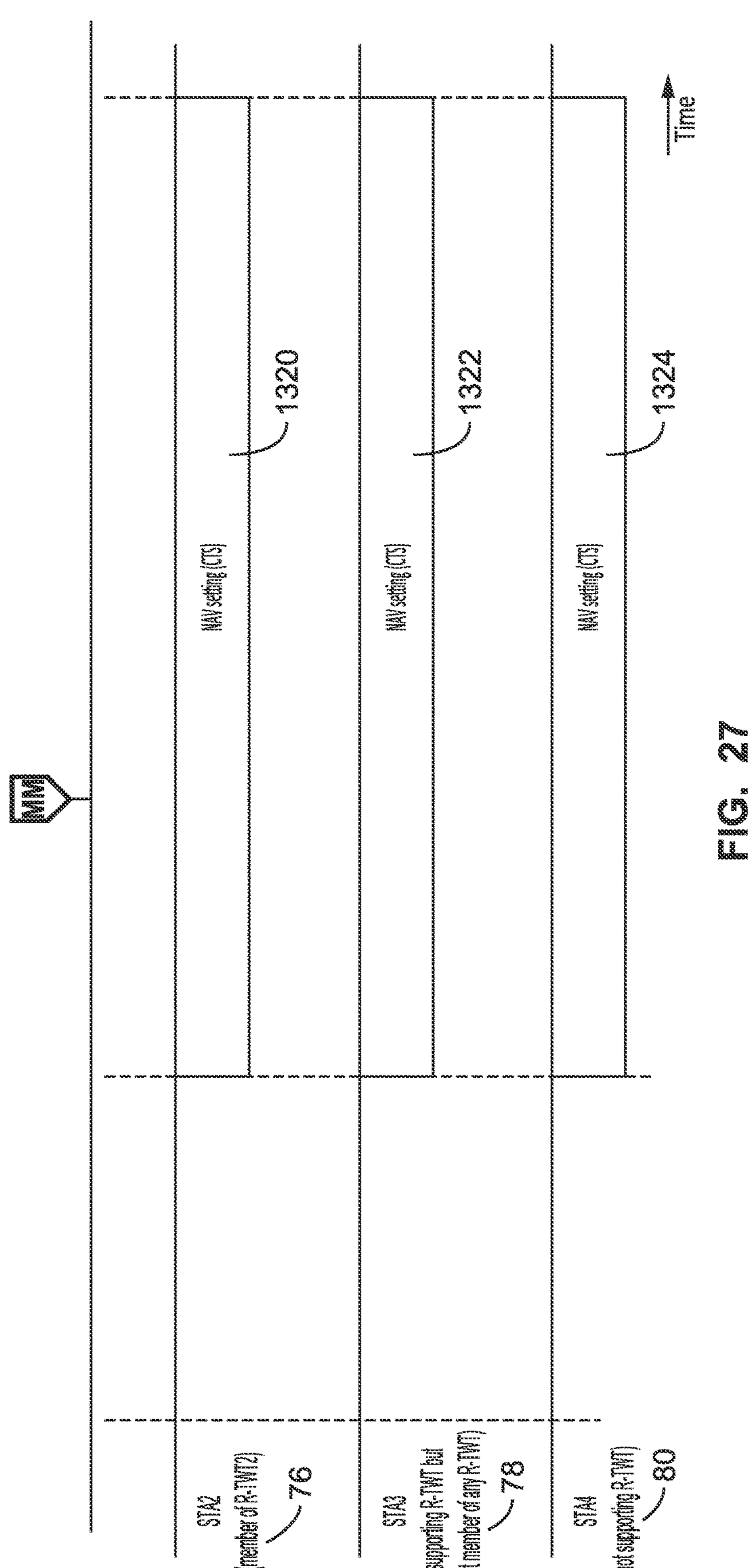

FIG. 26 and FIG. 27 illustrate an example embodiment 1310 of using a CTS frame (a CTS frame with RA field set to AP MAC address) for the AP to reserve the TXOP and indicate TXOP sharing. As in the previous figures, example communications are depicted between AP1 72, STA1 74, STA2 76, STA3 78 and STA4 80. In this example, STA1 is a member of R-TWT1, STA2 is a member of R-TWT2, STA3 supports R-TWT operation but is not a member of any R-TWT, and STA4 does not support R-TWT.

During R-TWT1 SP 1311, all the member STAs (AP1 and STA1) of a R-TWT SP and the R-TWT scheduling AP contend for the channel together, seen as BOs 1312, 1314. They both obtain the channel during the R-TWT SP, and each sends a CTS frame 1316 and 1318.

As shown in the figure, AP1 and STA1 contend for the channel together during R-TWT1 SP. AP1 uses EDCAFs of the ACs corresponding to the R-TWT1 DL TIDs. STA1 uses EDCAFs of the ACs corresponding to the R-TWT1 UL TIDs of STA1.

As shown in the figure, AP1 and STA1 gain the channel access at the same time. They send CTS to AP frames at the same time. Other STAs that are not member STAs of R-TWT1 set the NAV 1320, 1322, 1324, according to the CTS frame while the member STAs of the R-TWT1 may ignore the NAV setting. It should be noted that the scrambling seed of the CTSs are set to the same value when they are sent at the same time. For example, the scrambling seed of the CTS can be based on the R-TWT end time.

Then, AP1 becomes the TXOP holder and starts a frame exchange of the R-TWT1 TIDs during the R-TWT1 SP. In particular, AP1 is seen sending BSRP 1326 and receiving a BSR 1328 from STA1. AP1 then sends a Trigger Frame (TF) 1330, to which STA1 responds with PPDU 1332, which is acknowledged by AP1 with BA 1334. AP1 then sends PPDU 1336, which is acknowledged by STA1 with BA 1338.

In at least one embodiment/mode/option only the member STA of R-TWT1 that has frames of the UL R-TWT TID of R-TWT1 in the buffer can contend for the channel. In at least one embodiment/mode/option only the EDCAFs corresponding to the frames of the UL R-TWT TID of R-TWT1 (and/or P2P traffic that is scheduled to prioritized to transmit during R-TWT1 SP) can perform a backoff during R-TWT1 SP.

In at least one embodiment/mode/option the R-TWT1 SP is a trigger based R-TWT SP, and the member STA of R-TWT1 which gains channel access during R-TWT1 SP has to send a frame (such as a CTS frame), to share its TXOP with the AP and thus allow the AP to behave as the TXOP holder immediately after it gains channel access. It is possible that if any member STA of R-TWT1 sends or receives a CTS frame to the AP during a R-TWT1 SP, then it should not contend for the channel until the end of the R-TWT1 SP.

In at least one embodiment/mode/option if the AP obtains the TXOP (including the TXOP shared by the non-AP STA)

during R-TWT1, it can use the TXOP to transmit the frames of DL R-TWT TIDs of any member STAs of R-TWT1. For example, the AP can transmit the frames of a DL R-TWT TID of a non-primary AC first, then the frames of another DL R-TWT TID of the primary AC. Thus, the AP can decide to transmit any frames of all DL R-TWT TIDs of all member STAs of R-TWT1.

In at least one embodiment/mode/option the CTS to AP frame sent by the AP or member STAs have to reserve the TXOP until the end of the R-TWT SP.

5.11. Example 11

Figure 28:
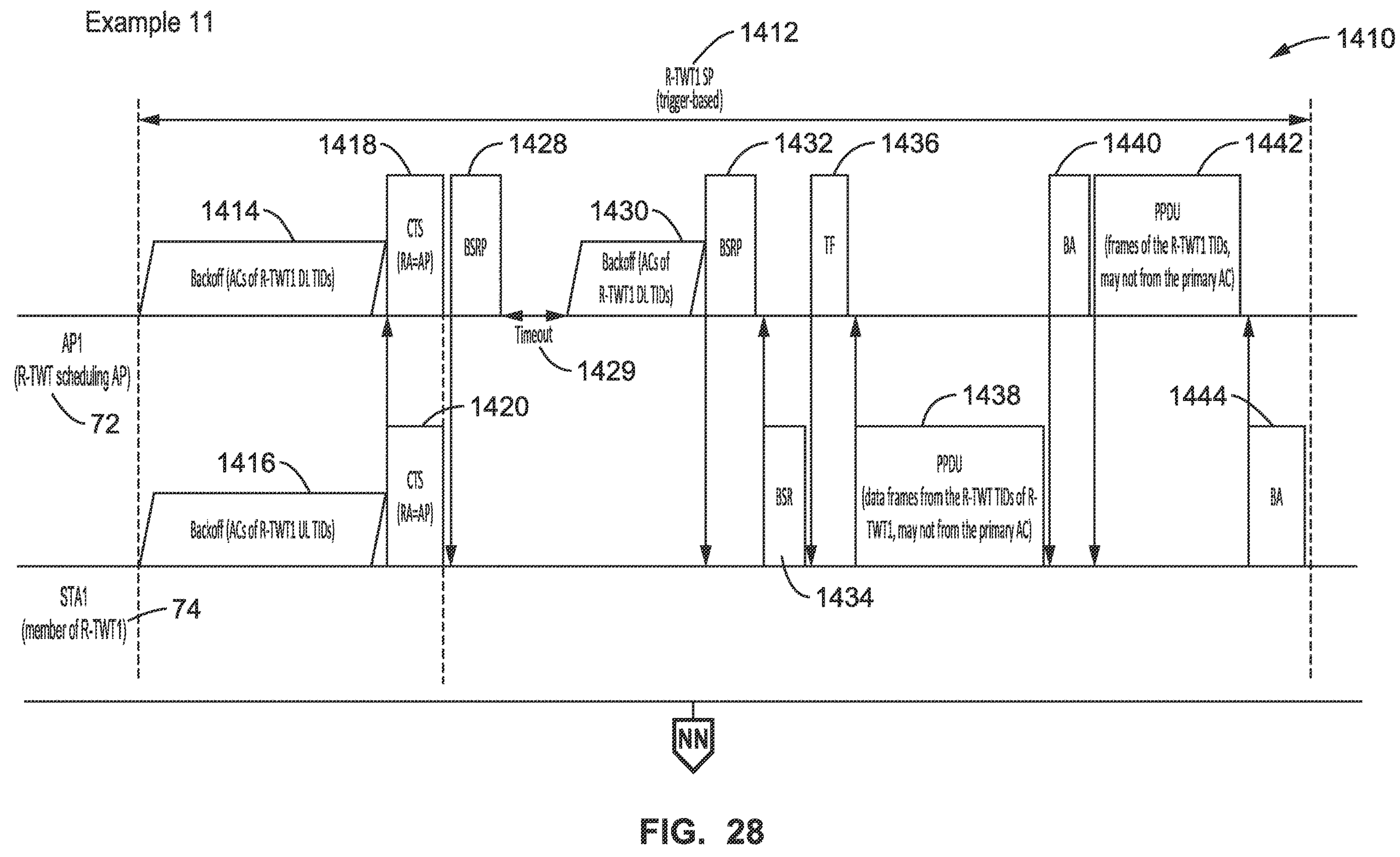
FIG. 28 and FIG. 29 is a communications diagram of Example 11 for R-TWT scheduling according to at least one embodiment of the present disclosure.
Figure 29:
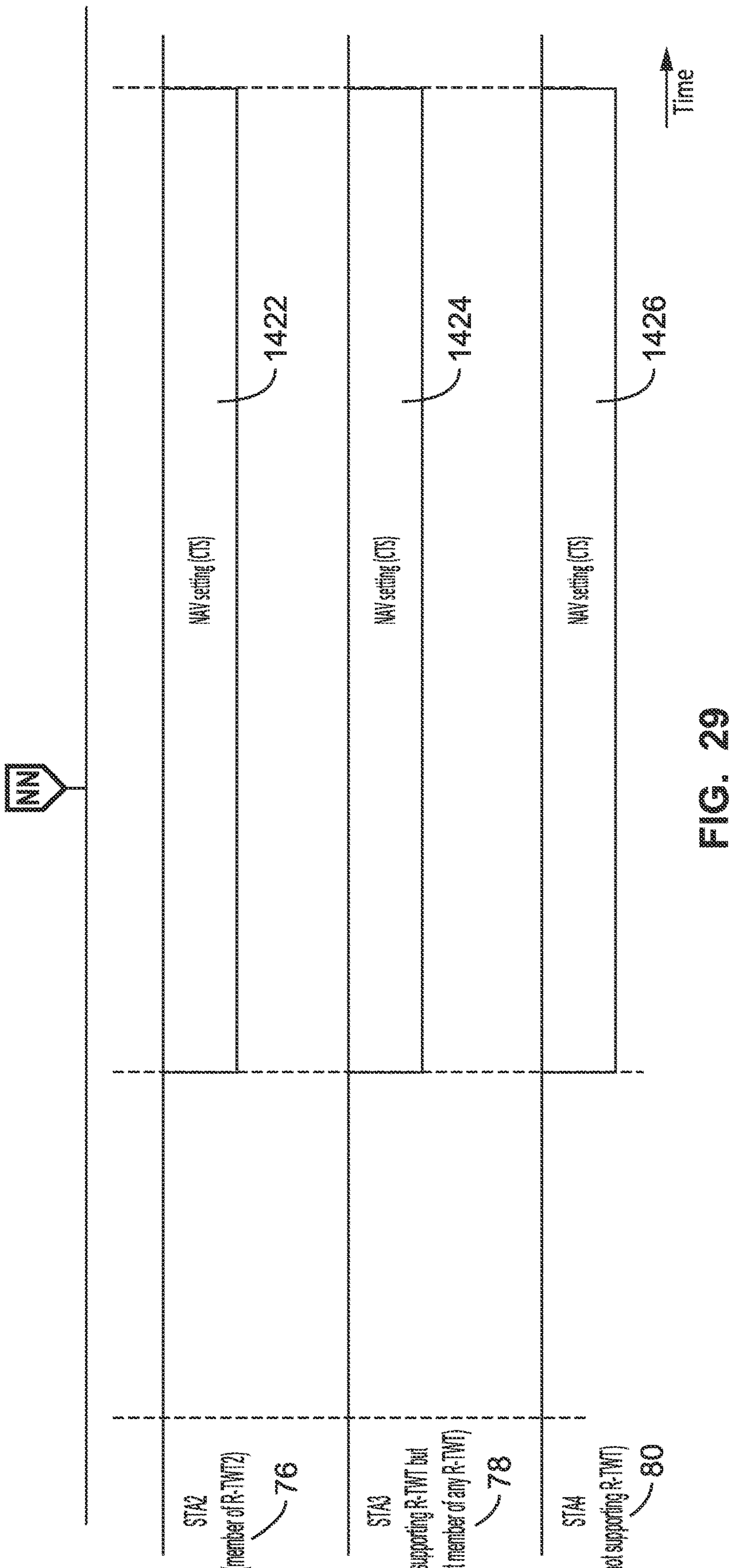

FIG. 28 and FIG. 29 illustrate an example embodiment 1410 of TXOP recovery when transmission errors occurs during the TXOP. As in the previous figures, communications are depicted between AP1 72, STA1 74, STA2 76, STA3 78 and STA4 80.

As in Example 10, during R-TWT1 SP 1412, all the member STAs (AP1 and STA1) of a R-TWT SP and the R-TWT scheduling AP contend for the channel together, seen as BOs 1414, 1416. They both obtain the channel during the R-TWT SP, and each send a CTS 1418 and 1420. The other STAs have set NAV 1422, 1424 and 1426 for the duration of the R-TWT1 SP 1412.

However, when the R-TWT scheduling AP receives or transmits a CTS to AP frame during a R-TWT SP, the AP is the only STA which can contend the channel during the R-TWT SP. In other words, when a member STA receives or transmits a CTS to AP frame during a R-TWT SP, it cannot contend for the channel until the R-TWT SP ends.

AP1 becomes the TXOP holder and sends a BSRP frame 1428 to STA1 but does not receive a response within timeout 1429. STA1 is not allowed to contend for the channel until the R-TWT1 SP ends.

After the timeout, AP1 contends 1430 for, and obtains the channel and sends BSRP 1432, to which STA1 responds with BSR 1434. AP1 then sends a TF 1436, to which STA1 responds by transmitting PPDU 1438, which is acknowledged with BA 1440 by AP1. AP1 then sends PPDU 1442 to STA1, which sends BA 1444.

5.12. Example 12

Figure 30:
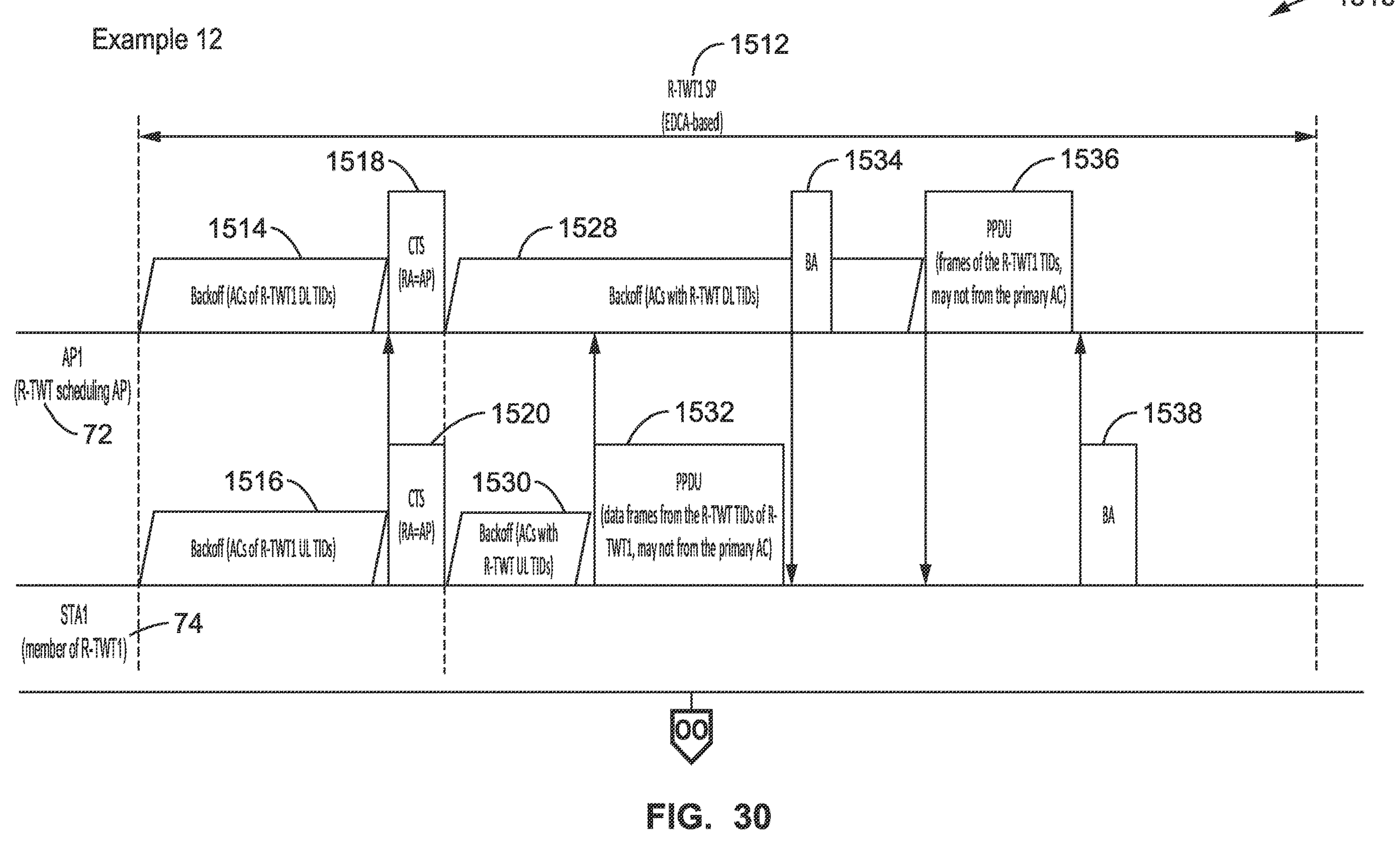
FIG. 30 and FIG. 31 is a communications diagram of Example 12 for R-TWT scheduling according to at least one embodiment of the present disclosure.
Figure 31:
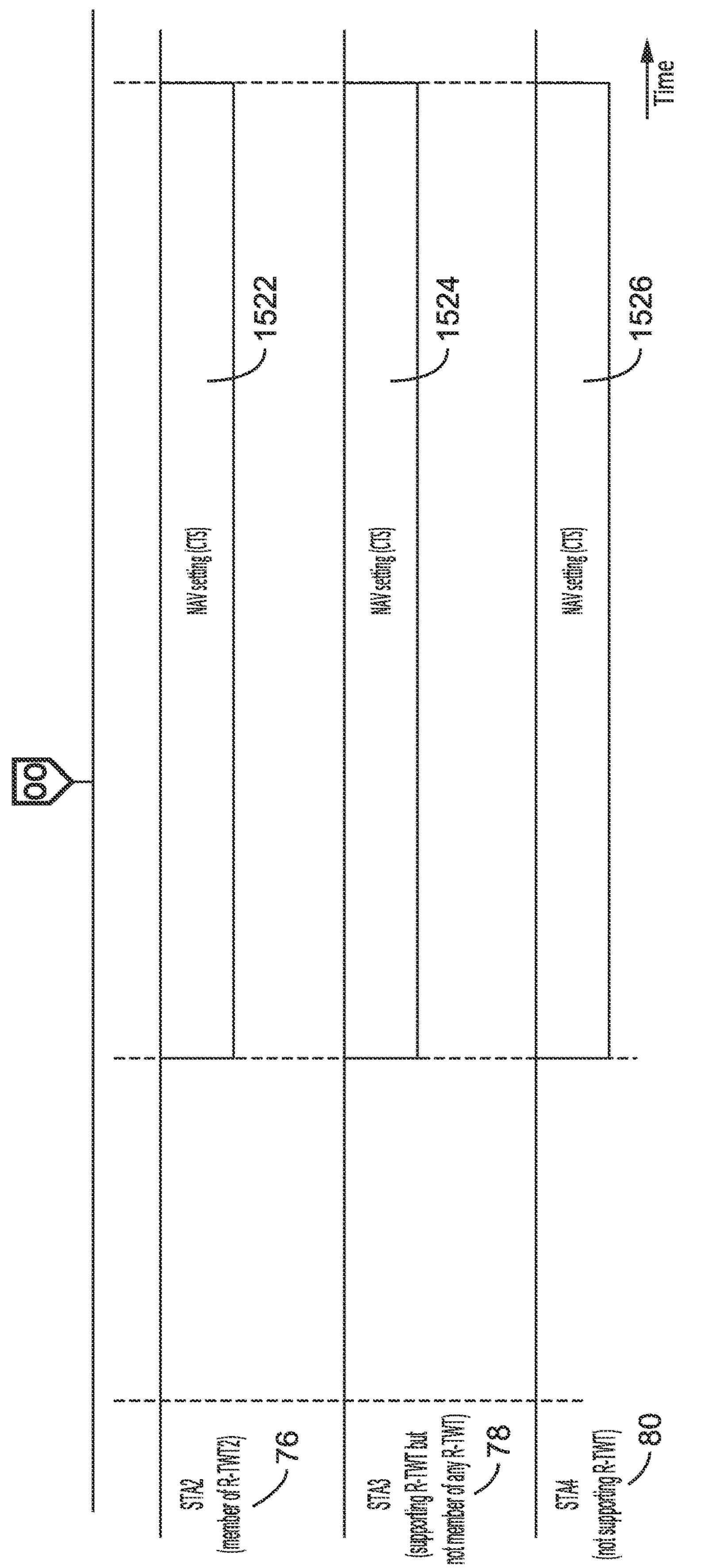

FIG. 30 and FIG. 31 illustrate an example embodiment 1510 of TXOP recovery when a transmission errors occurs during the TXOP. As in the previous figures, communications are depicted between AP1 72, STA1 74, STA2 76, STA3 78 and STA4 80.

As in Example 11, during R-TWT1 SP 1512, all the member STAs (AP1 and STA1) of a R-TWT SP and the R-TWT scheduling AP contend for the channel together, seen as BOs 1514, 1516. They both obtain the channel during the R-TWT SP, and each sends a CTS 1518 and 1520. The other STAs have set NAVs 1522, 1524 and 1526 for the duration of the R-TWT1 SP 1512.

When the R-TWT scheduling AP receives or transmits a CTS to AP frame during a R-TWT SP, the AP is the only STA which can contend for the channel during the R-TWT SP. In other words, when a member STA receives or transmits a CTS to AP frame during a R-TWT SP, it cannot contend for the channel until the R-TWT SP ends.

Then, the AP and the R-TWT1 member STAs, in this case STA1, contend for the channel again 1528, 1530 if the R-TWT1 SP is EDCA based (or not trigger based). The R-TWT1 member STAs can ignore NAVs due to the CTS frame and contend for the channel during R-TWT1 SP.

In the figure STA1 is seen obtaining the channel and transmitting PPDU 1532 to AP1, which responds with BA 1534. AP1 obtains the channel and sends PPDU 1536 to STA1 which responds with BA 1538.

6. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure(s) algorithm(s), step(s), operation(s), formula (e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit in reserving channel resources for frame exchanges of latency sensitive traffic with member STAs of the restricted-target wake time (R-TWT) service periods (SPs), comprising: (d) (i) gaining channel access by a non-AP STA before the scheduled start time of a R-TWT SP; (d) (ii) reserving a transmit opportunity (TXOP) that overlaps the R-TWT SP, by the non-AP STA; (d) (iii) wherein the non-AP STA, as TXOP holder, performs any desired TXOP operations before the scheduled start time of the R-TWT SP; and (d) (iv) sharing the TXOP by the non-AP STA, with an AP, which is allowed to behave as the TXOP holder until the TXOP or the R-TWT SP ends.

An apparatus for wireless communication in a network, the apparatus comprising: (a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit in reserving channel resources for frame exchanges of latency sensitive traffic with member STAs of the restricted-target wake time (R-TWT) service periods (SPs), comprising: (d) (i) gaining channel access, by the STA operating as an AP or non-AP STA, before the scheduled start time of a R-TWT SP; (d) (ii) reserving a TXOP, by the STA operating as an AP or non-AP STA, until the scheduled end time of R-TWT SP; and (d) (iii) transmitting frames of the latency sensitive traffic of the R-TWT, by the STA operating as an AP or non-AP STA, from both the primary access category (AC) and non-primary ACs, with higher priority than other frames during the R-TWT SP.

A method of performing wireless communication in a network, comprising: (a) performing transmission of frames between the medium access control (MAC) layers of an IEEE 802.11 network between wireless stations, each STA of which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links, to perform steps of a wireless communications protocol in reserving channel resources for frame exchanges of latency sensitive traffic with member STAs of the restricted-target wake time (R-TWT) service periods (SPs); (b) gaining channel access by a non-AP STA before the scheduled start time of a R-TWT SP; (c) reserving a transmit opportunity (TXOP) that overlaps the R-TWT SP, by the non-AP STA; (d) wherein the non-AP STA, as TXOP holder, performs any desired TXOP operations before the scheduled start time of the R-TWT SP; and (e) sharing the TXOP by the non-AP STA, with an AP, which is allowed to behave as the TXOP holder until the TXOP or the R-TWT SP ends.

The apparatus or method of any preceding implementation, wherein the non-AP STA reserving a TXOP that overlaps the R-TWT SP ignores the TXOP limit of the primary AC.

The apparatus or method of any preceding implementation, wherein the non-AP STA which reserves the TXOP that overlaps the R-TWT SP, reserves the TXOP until the scheduled end time of the R-TWT SP.

The apparatus or method of any preceding implementation, wherein the non-AP STA reserving a TXOP that overlaps the R-TWT SP, is not allowed to exceed the TXOP limit of the primary AC plus the R-TWT SP duration.

The apparatus or method of any preceding implementation, wherein the non-AP STA reserving a TXOP that overlaps the R-TWT SP, reserves the portion of the TXOP which does not exceed the scheduled end time of the R-TWT SP.

The apparatus or method of any preceding implementation, wherein the non-AP STA shares the TXOP with the AP either before or at a scheduled start time of the R-TWT SP.

The apparatus or method of any preceding implementation, wherein the non-AP STA is not allowed to share with the AP that portion of the TXOP which exceeds the scheduled end time of the R-TWT SP.

The apparatus or method of any preceding implementation, wherein the AP behaving as the TXOP holder shares the TXOP with the non-AP STA when the AP finishes transmissions during the R-TWT SP.

The apparatus or method of any preceding implementation, wherein member STAs of the R-TWT SP are not allowed to contend for the channel until the R-TWT SP ends after the AP has completed behaving as the TXOP holder.

The apparatus or method of any preceding implementation, wherein the non-AP STA which reserves the TXOP that overlaps the R-TWT SP, either: (a) reserves the TXOP until the scheduled end time of the R-TWT SP; (b) is not allowed to exceed the TXOP limit of the primary AC plus the R-TWT SP duration; and/or (c) reserves the portion of the TXOP which does not exceed the scheduled end time of the R-TWT SP.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:

(a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said STA for operating on the WLAN;

(c) a non-transitory memory storing instructions executable by the processor for communicating with other STAs; and (d) wherein said instructions, when executed by the processor, perform steps of a wireless communications protocol for said STA in reserving channel resources for frame exchanges of latency sensitive traffic with member STAs of restricted-target wake time (R-TWT) service periods (SPs), comprising:

(i) wherein a non-AP STA negotiates with an AP to obtain membership in an R-TWT SP;

(ii) contending for and gaining channel access by the non-AP STA before the scheduled start time of the R-TWT SP of which the non-AP STA is a member;

(iii) reserving a transmit opportunity (TXOP), by the non-AP STA, on the channel whose duration overlaps the R-TWT SP;

(iv) wherein the non-AP STA, as TXOP holder, performs any desired TXOP operations on the channel before the scheduled start time of the R-TWT SP on that same channel; and (v) sharing the TXOP by the non-AP STA, with an AP, which is allowed to behave as the TXOP holder until the TXOP or the R-TWT SP ends, in response to said non-AP STA sending an unsolicited message to the AP to indicate TXOP sharing, wherein additional channel contention for the R-TWT is eliminated.

2. The apparatus of claim 1, wherein the non-AP STA reserving a TXOP that overlaps the R-TWT SP ignores a TXOP limit of a primary AC.

3. The apparatus of claim 1, wherein the non-AP STA which reserves the TXOP that overlaps the R-TWT SP, reserves the TXOP until the scheduled end time of the R-TWT SP.

4. The apparatus of claim 1, wherein the non-AP STA reserving a TXOP that overlaps the R-TWT SP, is not allowed to exceed a TXOP limit of a primary AC plus the R-TWT SP duration.

5. The apparatus of claim 1, wherein the non-AP STA reserving a TXOP that overlaps the R-TWT SP, reserves a portion of the TXOP which does not exceed the scheduled end time of the R-TWT SP.

6. The apparatus of claim 1, wherein the non-AP STA shares the TXOP with the AP either before or at a scheduled start time of the R-TWT SP.

7. The apparatus of claim 1, wherein the non-AP STA is not allowed to share with the AP any portion of the TXOP which exceeds the scheduled end time of the R-TWT SP.

8. The apparatus of claim 1, wherein the AP behaving as the TXOP holder shares the TXOP with the non-AP STA when the AP finishes transmissions during the R-TWT SP.

9. An apparatus for wireless communication in a network, the apparatus comprising:

(a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said STA for operating on the WLAN;

(c) a non-transitory memory storing instructions executable by the processor for communicating with other STAs; and (d) wherein said instructions, when executed by the processor, perform steps of a wireless communications protocol for said STA in reserving channel resources for frame exchanges of latency sensitive traffic with member STAs of restricted-target wake time (R-TWT) service periods (SPs), comprising:

(i) contending for and gaining channel access, by the STA operating as an AP or non-AP STA, before the scheduled start time of a R-TWT SP;

(ii) reserving a TXOP on the channel, by the STA operating as an AP or non-AP STA, until the scheduled end time of R-TWT SP;

(iii) reserving a TXOP that overlaps the R-TWT SP, by the STA operating as an AP or non-AP STA which is not constrained by a TXOP limit of a primary access category (AC); and (iv) transmitting frames of the latency sensitive traffic of the R-TWT on the same channel without additional channel contention for the R-TWT, by the STA operating as an AP or non-AP STA, from both the primary AC and non-primary ACs, with higher priority than other frames during the R-TWT SP.

10. The apparatus of claim 9, wherein the STA reserving a TXOP that overlaps the R-TWT SP share its TXOP with the AP either at or before the scheduled start time of the R-TWT SP and allows the AP to behave as the TXOP holder during the TXOP.

11. The apparatus of claim 9, wherein the STA operating as an AP or non-AP STA extends the TXOP after the scheduled end time of the R-TWT SP, while not allowing the TXOP duration to exceed a TXOP limit of the primary AC.

12. A method of performing wireless communication in a network, comprising:

(a) performing transmission of frames between the medium access control (MAC) layers of an IEEE 802.11 network between wireless stations, each STA of which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links, to perform steps of a wireless communications protocol in reserving channel resources for frame exchanges of latency sensitive traffic with member STAs of restricted-target wake time (R-TWT) service periods (SPs);

(b) negotiating between a non-AP STA and an AP, so that said non-AP STA obtains membership in an R-TWT SP;

(c) contending for and gaining channel access by the non-AP STA before the scheduled start time of the R-TWT SP of which the non-AP STA is a member;

(d) reserving a transmit opportunity (TXOP)), by the non-AP STA, on the channel whose duration overlaps the R-TWT SP;

(e) wherein the non-AP STA, as TXOP holder, performs any desired TXOP operations on the channel before the scheduled start time of the R-TWT SP on that same channel; and (f) sharing the TXOP by the non-AP STA, with an AP, which is allowed to behave as the TXOP holder until the TXOP or the R-TWT SP ends, in response to said non-AP STA sending an unsolicited message to the AP to indicate TXOP sharing, wherein additional channel contention for the R-TWT is eliminated.

13. The method of claim 12, wherein the non-AP STA reserving a TXOP that overlaps the R-TWT SP ignores a TXOP limit of a primary AC.

14. The method of claim 12, wherein the non-AP STA which reserves the TXOP that overlaps the R-TWT SP, either: (a) reserves the TXOP until the scheduled end time of the R-TWT SP; (b) is not allowed to exceed a TXOP limit of a primary AC plus the R-TWT SP duration; and/or (c) reserves the portion of the TXOP which does not exceed the scheduled end time of the R-TWT SP.

15. The method of claim 12, wherein the non-AP STA shares the TXOP with the AP either before or at a scheduled start time of the R-TWT SP.

16. The method of claim 12, wherein member STAs of the R-TWT SP are not allowed to contend for the channel until the R-TWT SP ends after the AP has completed behaving as the TXOP holder.

17. An apparatus for wireless communication in a network, the apparatus comprising:

(a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said STA for operating on the WLAN;

(c) a non-transitory memory storing instructions executable by the processor for communicating with other STAs; and (d) wherein said instructions, when executed by the processor, perform steps of a wireless communications protocol for said STA in reserving channel resources for frame exchanges of latency sensitive traffic with member STAs of restricted-target wait time (R-TWT) service periods (SPs), comprising:

(i) contending for and gaining channel access, by the STA operating as an AP or non-AP STA, before the scheduled start time of a R-TWT SP;

(ii) reserving a TXOP on the channel, by the STA operating as an AP or non-AP STA, until the scheduled end time of R-TWT SP;

(iii) reserving a TXOP, by the STA operating as an AP or non-AP STA whose TXOP is not allowed to exceed a TXOP limit of a primary access category (AC) plus a R-TWT SP duration; and (iv) transmitting frames of the latency sensitive traffic of the R-TWT on the same channel without additional channel contention for the R-TWT, by the STA operating as an AP or non-AP STA, from both the primary AC and non-primary ACs, with higher priority than other frames during the R-TWT SP.

18. An apparatus for wireless communication in a network, the apparatus comprising:

(a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said STA for operating on the WLAN;

(c) a non-transitory memory storing instructions executable by the processor for communicating with other STAs; and (d) wherein said instructions, when executed by the processor, perform steps of a wireless communications protocol for said STA in reserving channel resources for frame exchanges of latency sensitive traffic with member STAs of restricted-target wait time (R-TWT) service periods (SPs), comprising:

(i) contending for and gaining channel access, by the STA operating as an AP or non-AP STA, before the scheduled start time of a R-TWT SP;

(ii) reserving a TXOP on the channel, by the STA operating as an AP or non-AP STA, until the scheduled end time of R-TWT SP;

(iii) wherein the STA operating as an AP or non-AP STA extends the TXOP after the scheduled end time of the R-TWT SP, while not allowing the TXOP duration to exceed a TXOP limit of a primary access category (AC); and (iv) transmitting frames of the latency sensitive traffic of the R-TWT on the same channel without additional channel contention for the R-TWT, by the STA operating as an AP or non-AP STA, from both the primary AC and non-primary ACs, with higher priority than other frames during the R-TWT SP.

* * * * *